United States Patent
Dent et al.

(10) Patent No.: US 8,090,320 B2
(45) Date of Patent: Jan. 3, 2012

(54) STRONG SIGNAL TOLERANT OFDM RECEIVER AND RECEIVING METHODS

(75) Inventors: Paul Wilkinson Dent, Pittsboro, NC (US); Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 468 days.

(21) Appl. No.: 12/339,630

(22) Filed: Dec. 19, 2008

(65) Prior Publication Data

US 2010/0159858 A1    Jun. 24, 2010

(51) Int. Cl.
*H04B 1/00* (2006.01)

(52) U.S. Cl. ......... 455/63.1; 455/69; 455/126; 455/295; 455/296

(58) Field of Classification Search ............ 455/24, 455/69, 63.1, 126, 249.1, 266, 234.1, 245.2, 455/324, 317, 395, 396, 295, 296
See application file for complete search history.

(56) References Cited

U.S. PATENT DOCUMENTS

| | | | |
|---|---|---|---|
| 4,888,557 A | 12/1989 | Puckette, IV et al. | |
| 5,241,702 A | 8/1993 | Dent | |
| 5,568,520 A | 10/1996 | Lindquist et al. | |
| 5,712,637 A | 1/1998 | Lindquist et al. | |
| 5,749,051 A * | 5/1998 | Dent | 455/324 |
| 6,094,564 A * | 7/2000 | Tomiya et al. | 455/73 |
| 6,370,205 B1 | 4/2002 | Lindoff et al. | |
| 6,397,051 B1 * | 5/2002 | Abbasi et al. | 455/295 |
| 6,449,320 B1 | 9/2002 | Lindoff | |
| 6,473,471 B2 | 10/2002 | Lindquist et al. | |
| 6,606,484 B1 | 8/2003 | Faulkner | |
| 6,973,138 B1 * | 12/2005 | Wright | 375/297 |
| 7,038,733 B2 * | 5/2006 | Dent | 348/614 |
| 7,046,720 B2 | 5/2006 | Lindoff et al. | |
| 7,706,769 B2 * | 4/2010 | Perkins | 455/295 |

(Continued)

FOREIGN PATENT DOCUMENTS

| | | |
|---|---|---|
| FR | 2898746 A1 | 9/2007 |
| WO | 98/04050 | 1/1998 |
| WO | 01/41387 A1 | 6/2001 |

OTHER PUBLICATIONS

Mattisson, S. et al. "Methods and Apparatus for Suppressing Strong-Signal Interference in Low-IF Receivers." Co-pending U.S. Appl. No. 12/147,962, filed Jun. 27, 2008.

(Continued)

*Primary Examiner* — Linh Nguyen
(74) *Attorney, Agent, or Firm* — Coats & Bennett, P.L.L.C.

(57) ABSTRACT

Circuits and methods are disclosed for compensating for received signal distortion caused by non-linearities in wideband receivers. An exemplary receiver includes a distortion waveform generator configured to approximate non-linear response characteristics of a downconverter circuit used to downconvert the received radio frequency signal. The resulting estimated distortion waveform is filtered, using filter(s) substantially similar to those used for filtering an intermediate frequency signal that includes the desired signal and non-linear distortion products caused by strong interfering signals. The filtered estimated distortion waveform and intermediate frequency signal are sampled, to obtain a sampled distortion signal and a sampled signal of interest. The sampled distortion signal and the sampled signal of interest are divided into a plurality of frequency channels. For a selected number of frequency channels, the sampled distortion signal for a frequency channel is scaled, and subtracted from the corresponding sampled signal of interest for the same frequency channel to obtain reduced-interference signal samples for the frequency channel.

22 Claims, 9 Drawing Sheets

U.S. PATENT DOCUMENTS

| | | | |
|---|---|---|---|
| 7,876,867 B2 * | 1/2011 | Filipovic et al. | 375/346 |
| 2003/0043927 A1 | 3/2003 | Suzuki | |
| 2004/0048576 A1 | 3/2004 | Hildebrand et al. | |
| 2005/0159124 A1 | 7/2005 | Shah | |
| 2006/0045001 A1 | 3/2006 | Jalali | |
| 2007/0184782 A1 | 8/2007 | Sahota et al. | |
| 2007/0189403 A1 * | 8/2007 | Alletto et al. | 375/260 |
| 2008/0039045 A1 * | 2/2008 | Filipovic et al. | 455/295 |
| 2009/0075610 A1 * | 3/2009 | Keehr et al. | 455/137 |
| 2009/0086864 A1 * | 4/2009 | Komninakis et al. | 375/346 |
| 2010/0159837 A1 * | 6/2010 | Dent et al. | 455/63.1 |

OTHER PUBLICATIONS

Dent, P. W. et al. "Methods and Apparatus for Reducing Own-Transmitter Interference in Low-IF and Zero-IF Receivers." Co-pending U.S. Appl. No. 12/163,248, filed Jun. 27, 2008.

Dent, P. W. et al. "Own Transmitter Interference Tolerant Transceiver and Receiving Methods." Co-pending U.S. Appl. No. 12/339,726, filed Dec. 19, 2008.

International Search Report for PCT Application No. PCT/EP2009/058054 mailed Feb. 24, 2010.

* cited by examiner

US 8,090,320 B2

STRONG SIGNAL TOLERANT OFDM RECEIVER AND RECEIVING METHODS

TECHNICAL FIELD

The present invention relates generally to wireless receiver systems, and in particular relates to methods and apparatus for suppressing interference in such receivers caused by non-linear distortion from strong interfering signals.

BACKGROUND

In the field of radio receivers, there is a continuing effort to minimize the amount of tuned circuitry used. By reducing the number of tuned circuits, larger portions of the receiver may be integrated, resulting in smaller, and often less expensive, devices. This effort has resulted in widespread interest in homodyne receivers (also known as direct-conversion receivers) and low intermediate frequency (low-IF), or near-zero intermediate frequency (near-zero IF) receivers.

A well-known and common deficiency of some prior art homodyne and low-IF receivers is susceptibility to strong interfering signals. A typical front-end circuit for a radio receiver includes a filter just after the antenna input, with a bandwidth that is often significantly larger than the signal bandwidth for a given signal of interest. As a result, the signal admitted by the antenna bandpass filter may comprise one or more unwanted signals as well as the wanted signal. These unwanted signals may generate intermodulation products, among themselves and with local oscillator leakage signals appearing at the receiver input, due to square-law and higher-order distortion terms in the receiver's radio frequency (RF) circuitry. These intermodulation products may produce corrupting interference in the complex baseband signals.

Those skilled in the art will appreciate that potentially interfering signals may appear at the receiver across a spectrum extending over the total bandwidth of the receiver's RF filter or filters. Second-order (and various higher-order) inter-modulation products from these signals may thus overlap the desired downconverted signal when the intermediate frequency is less than the antenna bandwidth. In the case of a homodyne or zero-IF receiver, these interfering signals may manifest themselves as a varying DC offset, which is not easily compensated by the various means commonly employed to compensate a constant DC offset. A varying DC offset is most pronounced when interfering signals are amplitude modulated, or of a bursty type, such as with time-domain multiple access (TDMA) transmissions.

The following patents issued to one of the present inventors disclose compensation of DC offset in homodyne receivers, as well as addressing other practical deficiencies such as slope and other slow drifts: U.S. Pat. No. 5,241,702 to Dent, issued Aug. 31, 1993, entitled "DC Offset Compensation in a Radio Receiver"; U.S. Pat. No. 5,568,520 to Lindquist and Dent, issued Oct. 22, 1996, entitled "Slope, Drift and Offset Compensation in Zero-IF receivers"; U.S. Pat. No. 5,712,637, issued Jan. 27, 1998, a divisional of the above '520 patent; and U.S. Pat. No. 6,473,471, issued Oct. 29, 2002, also a divisional of the above.

Various other patents disclose compensation techniques for DC offsets, including varying DC offsets, in a homodyne receiver. These patents include several issued to Lindoff et al.: U.S. Pat. No. 6,370,205 entitled "Method and Apparatus for Performing DC-Offset Compensation in a Radio Receiver," issued Apr. 9, 2002; U.S. Pat. No. 6,449,320 entitled "Equalization with DC Offset compensation," issued Sep. 10, 2002; and U.S. Pat. No. 7,046,720, entitled "System and Method for DC Offset Compensation in a WCDMA Receiver," issued May 16, 2006.

In addition, U.S. Pat. No. 5,749,051, issued to current applicant Dent on May 5, 1998 and entitled "Compensation for Second Order Intermodulation in a Homodyne Receiver," discloses compensating varying DC offsets caused by strong signals in a homodyne receiver.

All the above mentioned patents are hereby incorporated by reference herein.

Related problems due to strong interfering signals have also been found to apply to non-homodyne, low-IF receivers in which the intermediate frequency is non-zero, but still lower than the total antenna filter bandwidth. In these low-IF receivers, it is still possible for two strong interfering signals within the RF bandwidth of the antenna bandpass filter to produce intermodulation products that spectrally overlap the desired IF signal. These interfering intermodulation products include second-order intermodulation products (or, more generally, even-order products), which arise due to the square-law term in the polynomial expansion of an RF circuit's non-linear transfer function. As is well-known, the square-law term may also be reduced by employing balanced, i.e. push-pull, circuit structures. However, another mechanism that can produce interference is second-order intermodulation between one or more strong received signals, which then proceeds to modulate a local oscillator leakage signal. Local oscillator leakage in RF circuitry is a prime source of DC offset in homodyne receivers in which the local oscillator is directly on the wanted signal frequency. In low-IF receivers, strong interfering signals can effectively modulate the local oscillator leakage signal, producing spectral components that are downconverted to the intermediate frequency.

Interference from this mechanism is proportional to the magnitude of the cubic term in the transfer function non-linearity, which is not reduced by employing balanced structures, but is still a function of second-order intermodulation between the external signals. In effect, one or more strong signals inter-modulate using two of the cubic term's powers, the result of which is transferred to own local oscillator leakage via the third power. Both direct second-order intermodulation and the latter mechanism produce interference proportional to second-order intermodulation between external signals.

Although various solutions have been proposed for eliminating or reducing DC-offset problems in homodyne receiver, including those disclosed in the aforementioned U.S. Pat. No. 5,749,051 (hereinafter referred to as "the '051 patent"), further improvements are required to suppress strong signal interference arising through non-linearities in radio receivers using non-zero intermediate frequencies.

SUMMARY

The inventive circuits and methods disclosed herein compensate for unwanted distortion of a received signal in a wideband receiver caused by non-linearities in the receiver circuitry. In some embodiments of the inventive circuits disclosed herein, a distortion waveform generator comprises non-linear circuitry configured to approximate one or more non-linear response characteristics of a downconverter circuit used to downconvert the received radio frequency signal. The estimated distortion waveform thus produced is filtered, using a filter or filters substantially similar to those used for filtering a received signal downconverted to a processing frequency, e.g., baseband, low IF, IF, high IF, etc. The signal of interest frequency includes the desired signal and one or more non-linear distortion products caused by one or more strong interfering signals. The filtered estimated distortion waveform and processing frequency signal are sampled, to obtain a sampled distortion signal and a sampled signal of interest. The sampled distortion signal and sampled signal of interest are divided into a plurality of frequency channels. In an exemplary interference subtraction unit, the sampled distortion signal for a frequency channel is scaled, using a scaling factor determined for the same frequency channel, and subtracted from the sampled signal of interest for the same frequency channel to obtain reduced-interference signal samples for the frequency channel. This process is performed for each of a selected number of frequency channels. In some embodiments, the selected number of frequency channels comprises all of the plurality of frequency channels. In other embodiments, the selected number of frequency channels comprises a subset of frequency channels including fewer than the plurality of frequency channels.

In some embodiments, the scaling factor is determined by correlating the sampled signal of interest for each of the selected number of frequency channels with the corresponding sampled distortion signal for each of the same frequency channels. In some of these embodiments, frequency channel specific complex distortion signal samples, e.g., distortion signal samples comprising in-phase and quadrature components, are correlated with the corresponding complex samples of the signal of interest for each of the same frequency channels, to obtain a complex scaling factor for each of the selected number of frequency channels.

Several variants of a receiver circuit for reducing interference from intermodulation distortion in a receiver are disclosed. Corresponding methods are also disclosed.

DETAILED DESCRIPTION

Figure 1:
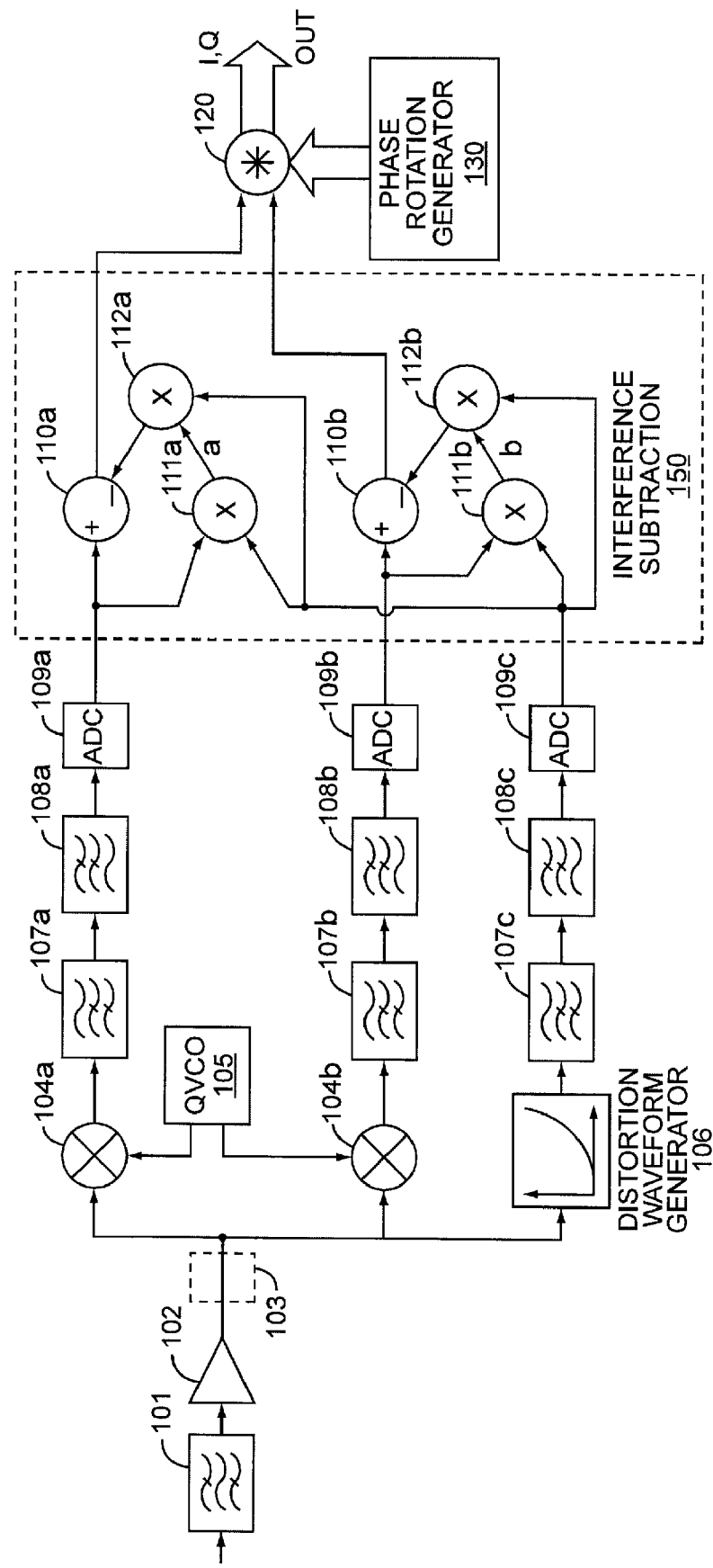
FIGS. 1-4 each illustrate an exemplary receiver circuit according to one or more embodiments of the invention.

The homodyne or direct-conversion receiver may be regarded as a variation of the traditional superheterodyne receiver. A superheterodyne receiver in general receives signals in a first frequency band and mixes the received signals with a locally generated oscillator signal, thus converting them to a second or intermediate-frequency (IF) band. By selecting the local oscillator frequency to be a constant amount away from a desired signal in the first frequency band, the desired signal always appears at the same frequency in the IF band, facilitating its selection by means of a fixed-tuned IF filter.

In the homodyne variation, the chosen "intermediate" frequency band is DC, or zero frequency. The local oscillator must then be tuned to the center of the desired received signal. At the mixer output, modulation on the desired signal, which typically is manifested as spectral components above and below the desired signal center frequency, is "folded." Thus, a signal component at a frequency offset $\Delta f$ above the desired signal's center frequency or $\Delta f$ below the desired signal's center frequency will appear at the mixer output at an absolute frequency of $\Delta f$. To allow the receiver to distinguish between these folded components, quadrature downconversion may be used, where two mixers are provided, using local oscillator signals that are phase offset by 90 degrees. In this case, an upper-sideband signal component A and lower-sideband signal component B will appear in the in-phase and quadrature mixer outputs as $I=A+B$ and $Q=j(A-B)$, respectively. The upper- and lower-sideband components may then easily be separated by forming $B=(I+jQ)/2$ and $A=(I-jQ)/2$.

Homodyne receiver operations are described in more detail in U.S. Pat. No. 5,241,702, which was incorporated by reference above. As noted above, homodyne receivers suffer from DC-offset problems that result from the fact that the local oscillator frequency is equal to the desired reception frequency. The DC-offset problems result in self-interference due to leakage of the local oscillator signal into the RF input of the downconversion circuit. Because the leakage signal is located precisely on the desired signal center frequency, the interfering component becomes converted to exactly zero frequency, or DC, at the downconverter outputs. The resulting DC offset component may be many orders of magnitude larger than the desired signal, and may be removed by applying the teachings of one or more of the above-referenced patents.

When at least one or more other strong interfering signals are present at any frequency at the input of a homodyne receiver's downconverter, such signals may be converted to DC by mixing with themselves through any even order distortion terms in the polynomial description of the mixer transfer function. As will be appreciated by those skilled in the art, this effect may be minimized by employing balanced mixer structures and push-pull RF amplifier structures. These techniques generally provide cancellation of even-order distortion, of which the most significant results from the square-law term of the circuit's non-linearities, also known as second-order intermodulation. Nevertheless, signals of sufficient strength may still produce fixed or variable DC offsets due to residual second-order nonlinearities of the downconverter circuit, due to imperfect balance in said balanced structures. In addition, odd-order distortion terms such as the third-order term may allow mixing of at least one strong signal with itself, using the first two orders, to produce a low frequency signal, which then mixes with a local oscillator leakage signal (using the third of the three orders) to impress low frequency modulation upon the local oscillator leakage signal.

The latter mechanism is also proportional to second-order distortion between the strong interfering signals, but arises due to the third-order distortion term in the RF circuit transfer function. Such third-order non-linearities are usually smaller than second-order non-linearities, but since odd-order terms are not suppressed by using balanced or push-pull circuit structures, these third-order distortion terms may be the dominant source of interference.

For example, consider an interfering radio-frequency signal $S_U$ and a local oscillator leakage signal $S_L$, operated upon by a cubic distortion term to produce:

$$(S_U+S_L)^3 = S_U^3 + 3S_U^2 S_L + 3S_U S_L^2 + S_L^3. \tag{1}$$

Those skilled in the art will appreciate that $3S_U^2 S_L$ may produce an interfering signal at the local oscillator frequency, which may then be downconverted to DC. Thus, $3S_U^2 S_L$ is a potentially damaging term in the expression of Equation (1). In effect, $S_U^2$ represents a square-law amplitude detection of the unwanted signal(s) $S_U$, the amplitude then modulating the local oscillator leakage $S_L$ such that it cannot be treated as a constant by a DC offset compensating mechanism. In a homodyne receiver, this interfering signal may be compensated using the techniques disclosed in the '051 patent.

When a low-IF receiver is used rather than a zero-IF receiver, it is not necessarily the amplitude modulation detected by the term $S_U^2$ which causes the interference, but rather a spectral component of it within the low-IF passband. Further, third-order terms resulting from two interfering signals and the local oscillator leakage may also fall within the low-IF passband. Depending on how low the IF is, these interference components may or may not be suppressed by the techniques disclosed in the '051 patent. Thus, enhancements to the techniques of the '051 patent will now be described reducing such interference, with the aid of FIG. 1.

In the exemplary receiver circuit of FIG. 1, a signal received via an antenna is filtered by antenna filter 101 and amplified by low-noise amplifier 102. In some embodiments the amplified signal is filtered further with an additional radio frequency (RF) filter 103, which is indicated as optional in the circuit of FIG. 1. The amplified received signal is then applied to quadrature mixers 104a and 104b, as well as to the distortion waveform generator 106.

The quadrature mixers 104a and 104b are driven by a quadrature local oscillator, commonly a voltage controlled oscillator controlled by a frequency synthesizer, which is pictured in FIG. 1 as QVCO 105. Unlike the local oscillator in a homodyne receiver, the local oscillator frequency in the circuit of FIG. 1 is not coincident with the carrier frequency or center of the wanted signal channel, but is instead offset by a frequency offset equal to the desired intermediate frequency. A common offset used for low-IF receivers for receiving frequency-multiplexed channels is one-half the channel spacing (i.e., one-half of the frequency separation between adjacent channels in the frequency-multiplexing scheme), which places the local oscillator just outside the signal spectrum on one edge of the desired channel or the other.

Another possible choice of intermediate frequency is an integer multiple of the data symbol transmission rate used in the channel, or an integer multiple of a sub-multiple of the data symbol rate, for example, one-half the symbol rate, one times the symbol rate, 1.5 times the symbol rate, and so on. One advantage of selecting an IF that is related to the symbol rate is that subsequent phase de-rotation of samples of the IF signal may be achieved using short, repetitive, phase sequences.

In a receiver using a non-zero IF, such as the receiver circuit of FIG. 1, a desired signal in the received radio signal is thus converted to an intermediate frequency band that does not include zero frequency. This permits DC offset, which would be troublesome in a homodyne receiver, to be removed by high-pass filters, as shown in FIG. 1 with high-pass filters 107a and 107b.

However, as was discussed above, strong signals may create not only DC offsets but interference covering a range of frequencies, as a result of non-linearities in the mixers 104a and 104b of FIG. 1. As discussed above, this interference may comprise various distortion products of unwanted signals and leakage from the local oscillator signal, and may be due to square-law terms, cubic terms, or higher-order terms in the polynomial expansion of the circuit's non-linearity.

The receiver circuit of FIG. 1 thus includes interference reducing circuitry, including distortion waveform generator 106. Distortion waveform generator 106 effectively mirrors one or more of the non-linear processes in mixers 104a and 104b by which strong, undesired signals are converted to interference that overlaps the signal spectrum. In some embodiments, distortion waveform generator 106 may approximate the non-linearities of mixers 104a and 104b using a device that produces square-law distortion. For example, a mixer circuit similar to that used in mixers 104a and 104b, but with the amplified received signal connected to both the RF input and local oscillator input could be used. Alternatively, a P-N junction or FET transconductance could provide a suitable non-linearity.

More accurate approximations of the non-linear distortion of mixers 104a and 104b may be produced by characterizing the mixer performance and constructing a circuit to replicate the non-linear characteristics of the mixers. This process might begin with measuring the strong signal interference appearing at the outputs of mixers 104a and 104b and plotting the interference versus the strength of the signals on a log/log (i.e. dB/dB) scale. The slope of the resulting plot then indicates the order of the non-linearity involved. An approximation of the non-linearity may then easily be designed using non-linear components such as diodes. In some cases, it may be necessary to match both a square-law term and a cubic term in the polynomial expansion of mixer non-linearities, the square-law term being necessary to estimate the product of a strong signal with itself while the cubic term approximates the product of one or more strong signals with local oscillator leakage.

In some embodiments, distortion waveform generator 106 may comprise two or more separate non-linear functions, e.g., one of which is predominantly a square-law non-linearity and another which is predominantly a cubic non-linearity. In some such embodiments, these separate distortion estimates may be separately processed (e.g., filtered and digitized) and then used to cancel interference to the desired intermediate frequency. In others, the separate distortion signal estimates may be combined before further processing, to produce a multi-term approximation of the interference produced by the receiver's downconverter circuit.

In the discussion that follows, an explanation of how a single non-linear interference signal is processed and subtracted is provided; those skilled in the art will recognize that the described approach may be readily applied to multiple distortion signal estimates produced by separate non-linear functions, e.g. square-law and cubic-law functions, whether the interference estimates are processed separately or together.

In any case, distortion waveform generator 106 approximates one or more components of the interference waveforms appearing at the outputs of mixers 104a and 104b, except that the estimated distortion waveform produced by distortion waveform generator 106 differs from the interference from mixers 104a and 104b by an as-yet-unknown scaling factor.

In the circuit of FIG. 1, the estimated distortion waveform produced by distortion waveform generator 106 is processed in essentially the same manner as the intermediate signals produced by mixers 104a and 104b. Thus, just as the intermediate frequency signals produced by mixers 104a and 104b are filtered by high-pass filters 107a and 107b to remove the unwanted DC components and higher-frequency interference products, so is the interference estimate signal from distortion waveform generator 106 filtered, using an identical (or similar) high-pass filter 107c. The high-pass filtering of each signal relieves the subsequent analog-to-digital converters (ADCs) 109a, 109b and 109c from requiring a dynamic range sufficient to encompass the DC offset component, which would in many cases dominate the signal.

All three signals, i.e., the outputs from mixers 104a and 104b and the output from distortion waveform generator 106 may also be low-pass filtered, to remove signal components above the highest-frequency components of the desired signal spectrum. Accordingly, in some embodiments, low-pass filters 108a, 108b, and 108c are configured to reject signals above a cut-off frequency equal to the IF center frequency plus half the bandwidth of the desired signal. The combined response of each pair of high-pass filter 107 and low-pass filter 108 thus selects the desired signal components, as well as any interference components that spectrally overlap the desired intermediate frequency band. The low-pass filters also allow the sampling rate of ADCs 109a, 109b, and 109c to operate at the lowest possible sampling frequency that meets the Nyquist sampling criterion for the desired signal bandwidth.

Those skilled in the art will appreciate that it is also possible, especially for somewhat higher intermediate frequencies, to use a bandpass filter, or a cascade of two or more filter blocks, with a net response that combines the responses of each pair of high-pass filter 107 and low-pass filter 108. Any of these filters or filter blocks may also be of the poly-phase type, further enhancing the image rejection performance of the receiver circuit. When poly-phase filters are used for any of filters 107a-b and 108a-b, phase compensation or corresponding poly-phase filtering may be applied to filters 107c and 108c.

Those skilled in the art will further appreciate that ADCs 109a-c may in some cases be bandpass ADCs, operating at a sampling frequency less than the intermediate frequency but greater than the bandpass filter bandwidth. In some embodiments, these bandpass ADCs may be configured to sample the input analog signals at pairs of points spaced by an odd multiple of quarter-periods at the intermediate frequency, thus producing in-phase and quadrature samples. Such "quadrature sampling" is explained in more detail in, for example, U.S. Pat. No. 4,888,557, issued to Puckette et al.

Those skilled in the art will appreciate that in each of the variants of the circuit of FIG. 1 discussed above, the processing performed on the intermediate frequency signals output from mixers 104a and 104b is also performed on the output of distortion waveform generator 106. Thus, extraneous interference components appearing outside the intermediate frequency band are removed by filters 107c and 108c. Furthermore, components of the estimated distortion waveform from distortion waveform generator 106 at or near the intermediate frequency experience similar delays and frequency response as seen by the intermediate frequency signals from mixers 104a and 104b. The result of this similar conditioning of the intermediate frequency signals and the interference estimation signal is that the estimated distortion waveform approximates the interference appearing in the intermediate frequency signal as closely as possible.

After analog-to-digital conversion in ADCs 109a-c, the in-phase and quadrature intermediate frequency signals and the estimated distortion waveform are in the numerical domain, and may be collected and stored in memory for non-real-time (i.e. offline) processing by interference subtraction circuit 150, which may comprise one or more digital signal processors, microprocessors, microcontrollers, or other digital hardware. Of course, non-real-time processing is not essential, but is often more convenient, as the system designer need only be concerned that the entire processing is completed within the time available, and need not be so concerned about maintaining the timing between individual parts of an extended synchronous process.

The processing in interference subtraction circuit 150 includes correlating, in correlators 111a and 111b, the estimated distortion waveform samples from ADC 109c with the signal samples from ADCs 109a and 109b. Correlators 111a and 111b may operate in various ways, but with the same objective: to determine scaling factors, illustrated as amounts a and b in FIG. 1, indicating how much of the interference signal is appearing in each of the signal paths over a predetermined averaging period.

The distortion signal samples from ADC 109c are then scaled by the scaling factors a and b in multipliers 112a and 112b. The scaled distortion signal samples are subtracted from the in-phase and quadrature samples of the intermediate frequency signal in subtracting circuits 110a and 110b, respectively. In alternative embodiments, of course, a scaling factor could be applied to the sampled signal of interest, rather than the distortion signal samples. In any event, the resulting interference-reduced samples are further processed to detect and decode data carried by the desired signal.

One method of correlation is to multiply the distortion signal samples by time-corresponding samples of the signal of interest, and summing the products over the averaging period. The resulting sum may, in some embodiments, be normalized by dividing by the number of samples used. Another method of correlation, which is shown in FIG. 1, is to scale the distortion signal samples with initial values for a and b (which may be arbitrary), and subtract the scaled distortion signal samples from the in-phase and quadrature signal samples, using subtracting circuits 110a and 110b. The resulting samples may then be correlated with the distortion signal samples to determine whether a residual portion of the interference signal estimate remains to be subtracted. The scaling factors a and b may then be updated to drive the residual interference component towards zero. Thus, those skilled in the art will appreciate that the subtraction circuits 110 and correlator circuits may be arranged in ways other than those illustrated in FIG. 1, while still achieving the objective of eliminating as far as possible the interference waveform defined by distortion signal samples produced by ADC 109c from the samples of the signal of interest produced by ADCs 109a and 109b, to obtain interference-reduced samples at the outputs of subtracting circuits 110a and 110b.

In the embodiment of FIG. 1, these interference-reduced signal samples comprise in-phase and quadrature components that together form a complex number that is rotating (on average) from one sample to the next by an angular phase of $2\pi f_{IF} \cdot \Delta T$, where $f_{IF}$ is the intermediate frequency and $\Delta T$ is the time between samples. This average phase rotation represents phase rotation induced by a carrier signal at the intermediate frequency, and may be removed by conventional phase de-rotation techniques. As shown in the circuit of FIG. 1, for example, the interference-reduced samples may be multiplied, using complex multiplier 120, by phase de-rotation samples $e^{j2\pi i/n}$ produced by phase rotation generator 130. (The value i is an integer index to successive samples, so that sample i receives an effective angular "de-rotation" of $2\pi i/n$.)

In some embodiments $f_{IF}$ and $\Delta T$ are conveniently selected so that $f_{IF} \Delta T$ is the reciprocal of an integer n, so that the phase rotation returns to the same point every n samples. However, this is not required; such operations merely simplify the function of phase rotation generator 130 in generating the complex multiplication factor $e^{j2\pi i/n}$. In general, the reciprocal of $f_{IF} \Delta T$ is an integer if both the sample rate and intermediate frequency are selected to be integer multiples of one-half of the symbol rate. However, even if they are not closely related to a symbol rate for the desired signal, $f_{IF} \Delta T$ may still be the ratio m/n of two integers, such that the sequence also repeats after n samples. However, in this case, n may be much longer. In the limit, of course, $f_{IF}\Delta T$ may be an irrational number, in which case a phase-derotation angle may be computed for each sample, rather than being plucked from a look-up-table.

In any case, referring once more to FIG. 1, the progressive phase rotation is removed in complex multiplier 120, where the interference-reduced signal samples, considered as a complex pair, are multiplied by the conjugate of the phase rotation factor to unwind the successive rotation. The result from complex multiplier 120 is an in-phase and quadrature (I,Q) representation of the desired signal, just as if a zero-IF or homodyne receiver had been used, except without the troublesome DC offset component. Furthermore, strong signal intermodulation components may be substantially reduced.

In FIG. 1, phase rotation generator 130 may be clocked (indexed) using the same clock used to drive the sampling in ADCs 109a-c. Since the digital processor 150 described above may operate in non-real time, i.e., using buffered samples of the distortion signal samples and the intermediate frequency samples, this simply means that a sample index i beginning at an arbitrary point is associated with successive samples and incremented for each successive sample, for example in the I/O routine that reads samples from the ADCs into the digital processor's memory. In some embodiments, the index may also be a memory address index, assuming samples are stored sequentially in memory. However, the index used for generator 130 may be reduced modulo-n, while a memory address index is not necessarily modulo-reduced by the same modulus, depending on the size of any circular buffer used. Therefore, a separate index i, which is incremented modulo-n, may be maintained in some embodiments, and associated with successive samples.

Those skilled in the art will appreciate that the techniques pictured in FIG. 1 and described above permit receivers to be built with intermediate frequencies that are much lower than half the bandwidth of antenna filter 101. Without the use of these techniques, such a receiver might otherwise be susceptible to, for example, interference from strong signals separated by the intermediate frequency that may pass through antenna 101 and be converted to the intermediate frequency. In conventional superheterodyne receivers, this interference is traditionally avoided by choosing IF frequencies that are greater than the maximum frequency separation of signals that may pass through antenna filter 101. In other words, conventional superheterodyne receivers use intermediate frequencies that are greater than the bandwidth of the receiver's RF filter or filters. However, as will be appreciated by those in the art, the use of low intermediate frequencies, as enabled by the techniques disclosed herein, has the advantage of permitting an earlier conversion to the digital domain, with a consequent reduction in the number of analog components, which in turn facilitates more efficient integration, and less expensive receivers.

In the preceding description of the receiver circuit of FIG. 1, the importance of treating the output of the distortion waveform generator 106 in the same manner as the intermediate frequency signal was emphasized. Of course, differences in circuit layout and component tolerances in filters 108a-c and 107a-c may cause small differences. These differences may be larger for circuits employing higher intermediate frequencies. In particular, when an intermediate frequency that is substantially higher than the signal bandwidth is selected, and filter pairs 107 replaced with bandpass filters, there may be significant phase shift differences between different bandpass filters. In this case, the scalar interference scaling factors a and b of FIG. 1 may not provide optimal suppression of the interference; an additional phase correction may be required.

Figure 2:
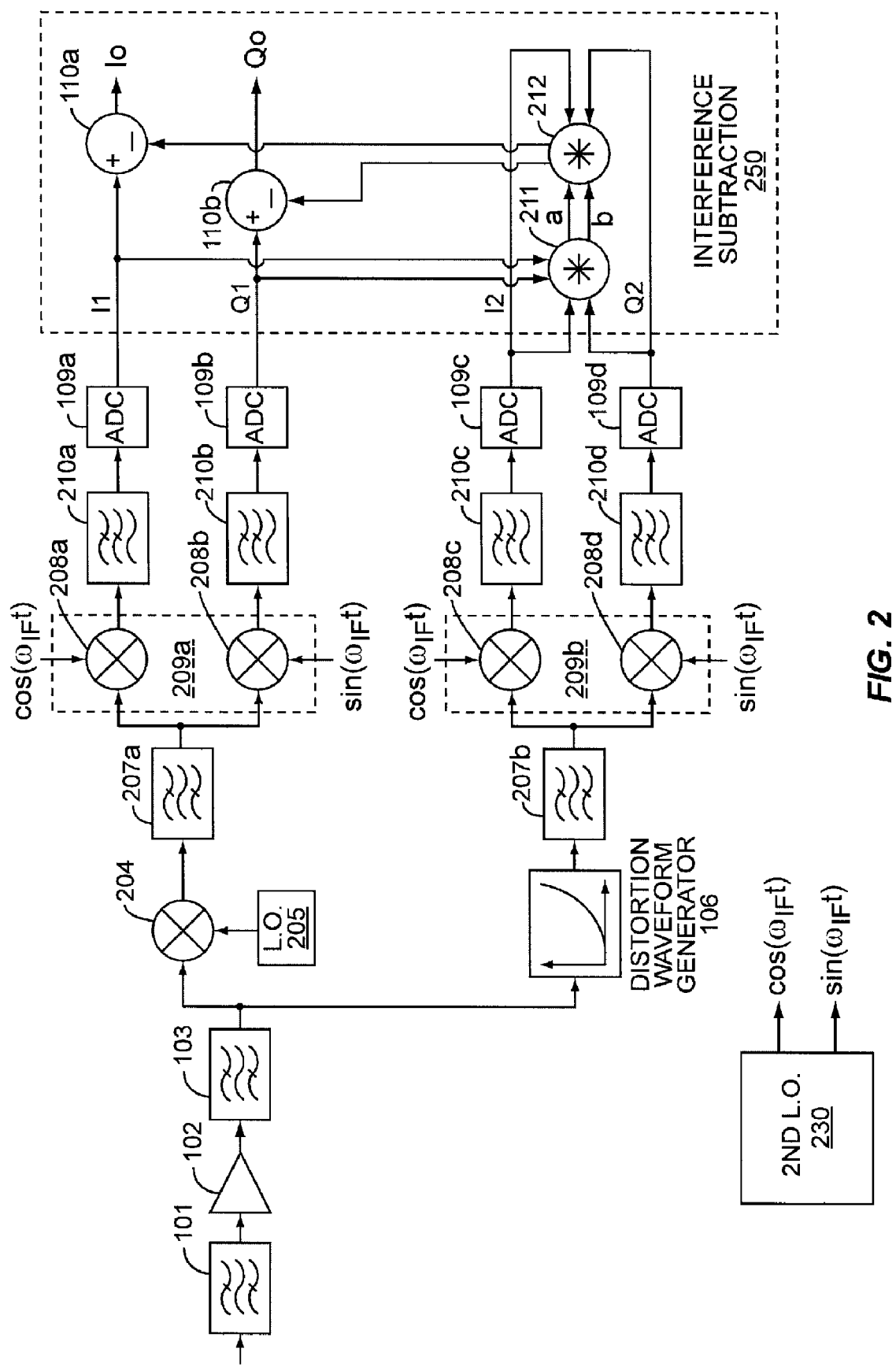

The circuit pictured in FIG. 2 provides an exemplary solution for such a case. FIG. 2 illustrates an exemplary receiver circuit, including elements of a conventional double-superheterodyne receiver. A first mixer 204 converts the input signal amplified by low-noise amplifier 102 to an intermediate frequency. The intermediate frequency in some embodiments may be high enough so that the combination of antenna filter 101 and filter 103 provide adequate image rejection, as in this implementation mixer 204 need not be an image-rejection mixer. Those skilled in the art will appreciate that when mixer 204 is not an image rejection mixer, filter 103 is probably not optional, as it was in the circuit of FIG. 1, but may be required or desirable in order to suppress amplified image noise from low-noise amplifier 102.

Mixer 204 is followed by a bandpass filter 207a tuned to the IF center frequency. In order for filters 101 and 103 to suppress the image response, the IF must be greater than half the combined bandwidth of filters 101 and 103, since the image is twice the IF away from the desired signal, to ensure that the image is outside the RF bandwidth selected by the these RF filters. However, to prevent two input signals falling within the antenna filter bandwidth from mixing, due to second-order non-linearities, to produce a distortion product at the IF, then the IF center frequency should be greater than the whole RF bandwidth. Therefore, there is a range of intermediate frequencies between one-half the RF bandwidth and the RF bandwidth that would still be susceptible to degradation by strong signal non-linear effects. This degradation may be reduced using the interference reduction techniques illustrated in FIG. 2.

As with the receiver circuit of FIG. 1, a distortion waveform generator 106 is provided, in order to "mimic," or approximate, the non-linearities in mixer 204 that permit strong signals to mix and create IF break-through. Distortion waveform generator 106 therefore generates a signal that approximates one or more components of strong-signal interference that appear at the output of mixer 204.

In the receiver circuit of FIG. 1, it was assumed that the IF was low enough that the entire spectrum of interest at the output of mixers 104a and 104b and distortion waveform generator 106 could be digitized using ADCs. However, with the higher IF contemplated for the receiver of FIG. 2, it may be desirable to avoid digitizing the entire spectrum from zero up to the IF, when only a relatively narrow band centered at the IF is of interest. Thus, this band of interest is selected at the output of mixer 204 by IF band-pass filter 207a. Since the estimated distortion waveform from distortion waveform generator 106 should be treated identically to the intermediate frequency signal, an identical (or substantially identical) band-pass filter 207b is provided to filter the estimated distortion waveform produced by distortion waveform generator 106. In other words, filters 207a and 207b are matched as closely as is practical.

If the filters were identically matched, interference suppression could be achieved by simply determining a scaling factor a to be applied to the waveform from filter 207b to obtain a scaled distortion signal for subtracting from the output of filter 207a. However, with the potential of a phase mismatch between filters 207a and 207b, the scaling of the distortion signal should preferably include a phase correction. This phase rotation may be achieved by using a complex scaling factor, in the form a+jb.

To determine the complex scaling factor a+jb, the signals at the outputs of band-pass filters 207a and 207b may be first converted to complex digital samples, since digital processing is more easily integrated. Thus, in the receiver of FIG. 2, the output of band-pass filter 207a is downconverted to a quadrature baseband using quadrature downconverter 209a, which comprises quadrature mixers 208a and 208b and low-pass filters 210a and 210b. The output of filter 207b is likewise downconverted, using quadrature downconverter 209b, which comprises mixers 208c and 208d, and low-pass filters 210c and 210d. The quadrature downconverters require cosine and sine mixing signals, which may be obtained for both from complex signal generator (second local oscillator) 230. In some embodiments, complex signal generator 230 may be a quadrature voltage-controlled oscillator (QVCO), controlled by a frequency synthesizer loop. In others, complex signal generator may comprise a numerical signal generator using cosine/sine look-up tables. Filter pairs 210a-b and 210c-d may also be implemented as two poly-phase filters, in some embodiments of the invention.

The outputs of each of the four filters 210a-d are digitized using ADCs 109a-d, producing a complex signal pair I1,Q1, corresponding to the in-phase and quadrature samples of the signal of interest, and a complex signal pair I2,Q2, corresponding to in-phase and quadrature samples of the distortion signal. These complex signals are supplied to interference subtraction circuit 250, where complex correlator 211 next correlates the sampled signal of interest (I1,Q1) with the distortion signal samples (I2,Q2), to determine the magnitude and phase, described by the complex correlation result a+jb, of interference in the sampled signal of interest. Complex correlation may be achieved by multiplying samples of the first signal by the complex conjugate of samples of the second signal over a predetermined time period, and averaging the result. Thus:

$$a + jb = \frac{1}{N}\sum_{k=1}^{N}(I1_k + jQ1_k)(I2_k + jQ2_k)^* \quad (2)$$

$$= \frac{1}{N}\sum_{k=1}^{N}(I1_k + jQ1_k)(I2_k - jQ2_k),$$

for N paired samples $I1_k, Q1_k$ and $I2_k, Q2_k$. Alternatively:

$$a = \frac{1}{N}\sum_{k=1}^{N}(I1_k \cdot I2_k + Q1_k \cdot Q2_k), \quad (3)$$

and $$b = \frac{1}{N}\sum_{k=1}^{N}(I2_k \cdot Q1_k - I1_k \cdot Q2_k). \quad (4)$$

The averaging period used by correlator 211 may in principle be quite long, as it is determining a scaling factor related to the generally static characteristics of mixer 204 and distortion waveform generator 106, i.e., it is determining by what complex factor the signal from non-linear interface estimation circuit 106 differs from the non-linear signals at the output of mixer 204. In general this relationship should not be signal dependent, although it may be temperature or voltage dependent. Thus, in some embodiments it is sufficient to use an averaging period that is perhaps 100-1000 times the reciprocal of the signal bandwidth, so that radio noise is substantially averaged out. Given a Nyquist sampling rate, then averaging the correlation over 200 to 2000 sample pairs may be envisaged.

Those skilled in the art will appreciate that some embodiments of the circuit pictured in FIG. 2 may employ a rolling average, so that the complex scaling factor is continuously updated as new samples become available. Other embodiments may compute a new complex scaling factor for each new set of sample data. Still others may only occasionally compute complex scaling factor, periodically re-computing the scaling factor based on new sample data, to ensure that the relationship between the distortion signal estimate produced by the distortion waveform generator 106 and the interference appearing in the intermediate frequency signal remains under control.

In any case, complex multiplier 212 applies the complex scaling factor a+jb determined by correlator 211 to the interference estimate I2,Q2 to obtain a real part (aI2−bQ2), which is subtracted from the in-phase part of the sampled signal of interest (I1) in subtracting circuit 110a, and an imaginary part (bI2+aQ2), which is subtracted from the quadrature component of the sampled signal of interest (Q1) in subtracting circuit 110b, to obtain interference-reduced complex signal samples ($I_O, Q_O$).

In the receiver circuit pictured in FIG. 2, the IF was assumed to be such that the image response of first mixer 204 could be suppressed by RF filters 101 and 103. In other words, the IF was assumed to be higher than one-half of the composite bandwidth of these filters. If, however, the IF is selected to be a lower frequency, then the image response would instead need to be suppressed by using an image rejection mixer instead of a simple mixer 204. This option is illustrated in the receiver circuit of FIG. 3.

Figure 3:
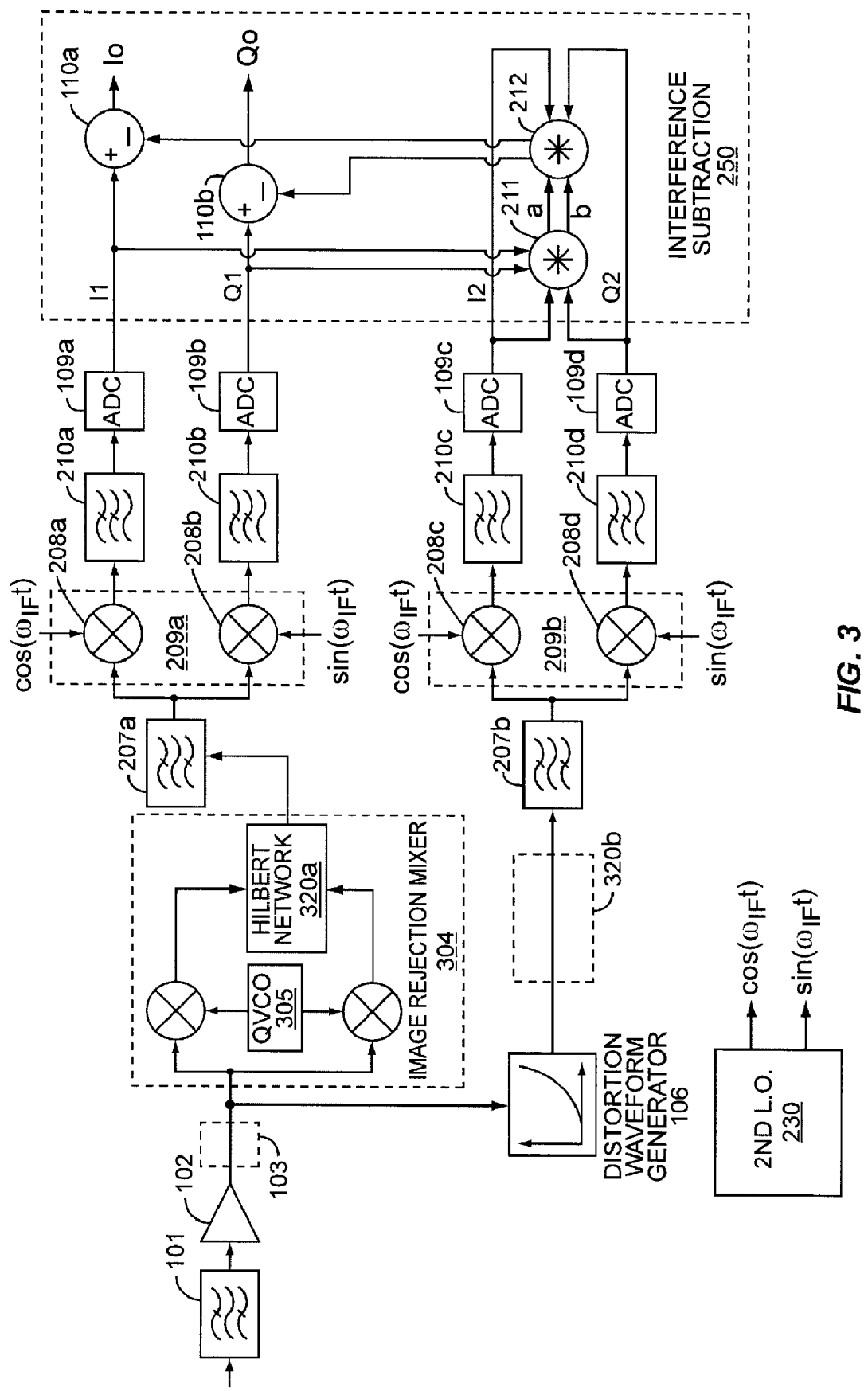

In the circuit of FIG. 3, a second bandpass filter 103, after the low-noise amplifier 102, once again becomes optional. Image noise from low-noise amplifier 102 may instead be suppressed by use of an image rejection mixer 304, which comprises a pair of mixers, driven in quadrature by a quadrature voltage-controlled oscillator 305. The outputs of the quadrature mixers are combined using a Hilbert network 320a. The Hilbert network 320a combines the output of the two mixers with a relative 90-degree phase shift over the band of interest, i.e., the IF bandwidth of the wanted signal. For example, it may apply a +45 degree phase shift to the signal from one mixer, and a −45 degree phase shift to the other mixer signal, before adding them. The summed signal comprises the desired downconverted signal, with any image signal suppressed. In addition, the summed signal includes non-linear interference due to strong signal breakthrough, as a result of the distortion mechanisms described earlier.

In adherence to the principle of treating the interference estimate from distortion waveform generator 106 the same as the desired signal, a copy of the Hilbert network 320a may be provided (as shown at 320b) in the interference path. In this case, both inputs of the Hilbert network would be connected to the output of non-linear function 106. However, this implementation is not necessary if the Hilbert network 320a provides a constant phase shift for both mixer signals over the IF bandwidth. A constant phase shift difference between the signal path and the interference path is captured by the complex correlation process at correlator 211; it is thus unnecessary to have a Hilbert network 320b in the interference path to ensure phase matching.

This operation may be explained mathematically as follows. Suppose the non-linear distortion products from the upper mixer of image rejection mixer 304 includes a distortion signal D, in the intermediate frequency band, which is scaled by α and changed in phase by θ in Hilbert network 320a. Suppose further that the same distortion term appears in the lower mixer of image rejection mixer 304, apart from being scaled by β and changed in phase by φ. Then the combined distortion of both mixers presented to bandpass filter 207a may be given as $D(\alpha \cdot e^{j\Theta} + \beta \cdot e^{j\Phi})$. However, if there are no other amplitude or phase differences between the intermediate frequency signal processing and the estimated distortion waveform processing, then the term $\alpha \cdot e^{j\Theta} + \beta \cdot e^{j\Phi}$ is simply the complex scaling factor a+jb determined by correlator 211. A more complex solution would thus only need to be considered if the distortion from the two mixers could be characterized simply as different scalings of the same waveform. In such a case, two or more distinct non-linear functions may need to be approximated by distortion waveform generator 106, in order to mimic separate non-linearities for each mixer.

Figure 4:
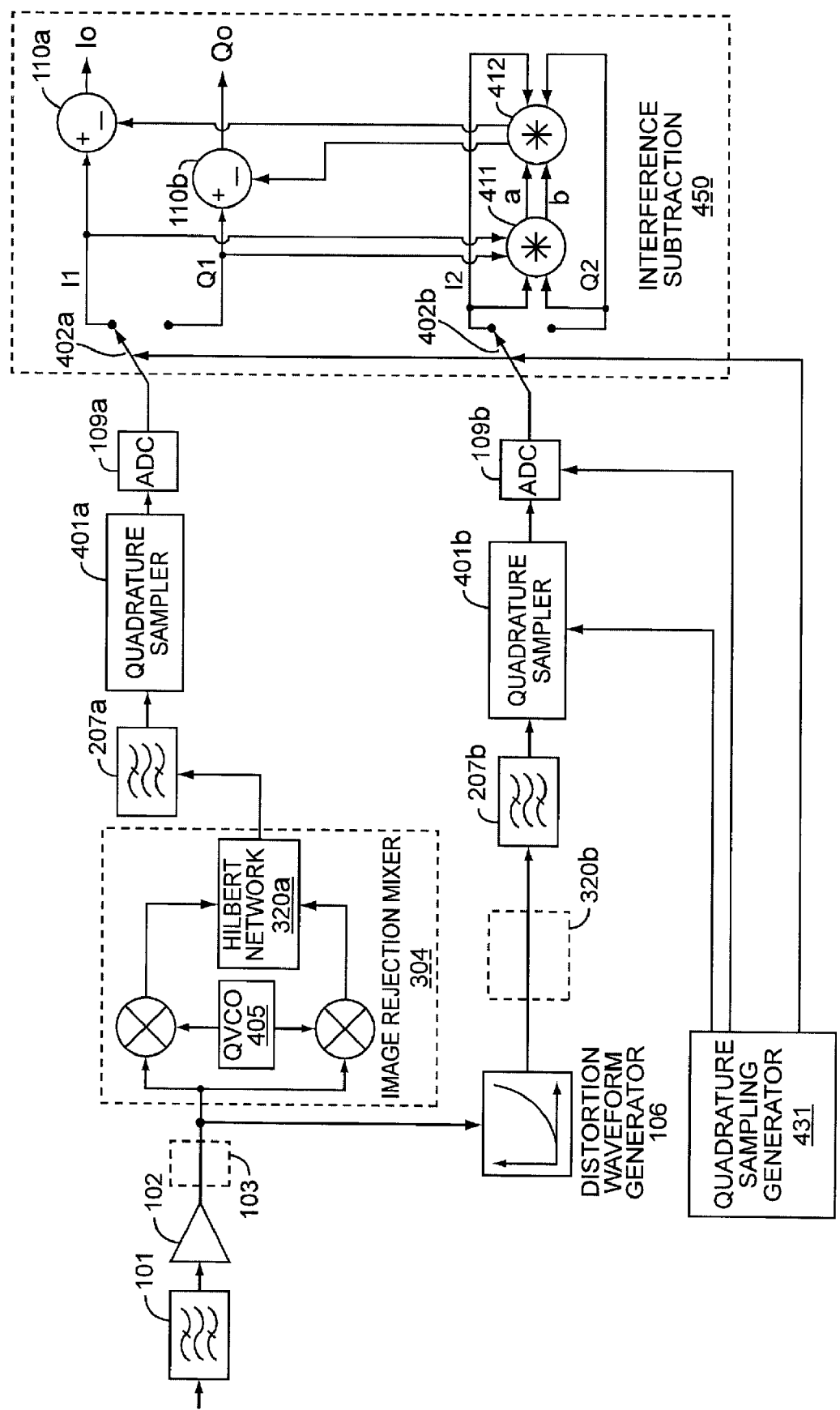

FIG. 4 illustrates another exemplary receiver circuit that is similar to circuit of FIG. 3, but using quadrature bandpass samplers 401a and 401b in place of the quadrature downconverters of FIG. 3. Those skilled in the art will appreciate that the receiver of FIG. 4 is similar to the receiver of FIG. 3, up to the outputs of band-pass filters 207a and 207b. However, in the exemplary receiver of FIG. 4, the outputs of filters 207a and 207b are input to quadrature samplers 401a and 401b.

These quadrature samplers 401a and 401b receive timing signals from quadrature sampling generator 431. The timing signals ensure that samples are taken in pairs, each pair preferably separated by a whole number of cycles of the intermediate frequency, and that each member of the pair is separated from the other by an odd number of quarter cycles. Thus, cosine (in-phase) and sine (quadrature) components of the IF signal are sampled alternately, and digitized by ADCs 109a and 109b. Interference subtraction circuit 450 includes de-multiplexing switches 402a and 402b, which may be synchronized by quadrature sampling generator 431, to separate the digitized samples into I and Q sample pairs for complex number processing at complex correlator 411 and complex multiplier 412. Although not shown, such processing may include, as is known in the art, a "de-skewing" operation, which compensates for the fact that I and Q are not sampled at the same instant. This de-skewing operation may be done, for example, by interpolating between successive I values and between successive Q values to a common sampling instant in between.

Using FIGS. 1 to 4, several variants of a receiver circuit configured to reduce interference from intermodulation distortion have been described. Each of these circuits provides means by which strong-signal interference effects in near-zero-intermediate frequency radio receivers may be compensated. Of course, those skilled in the art will appreciate that the illustrations are not necessarily exhaustive, and many variations may be made by a person skilled in the art without departing from the scope of the invention as described by the attached claims.

Figure 5:
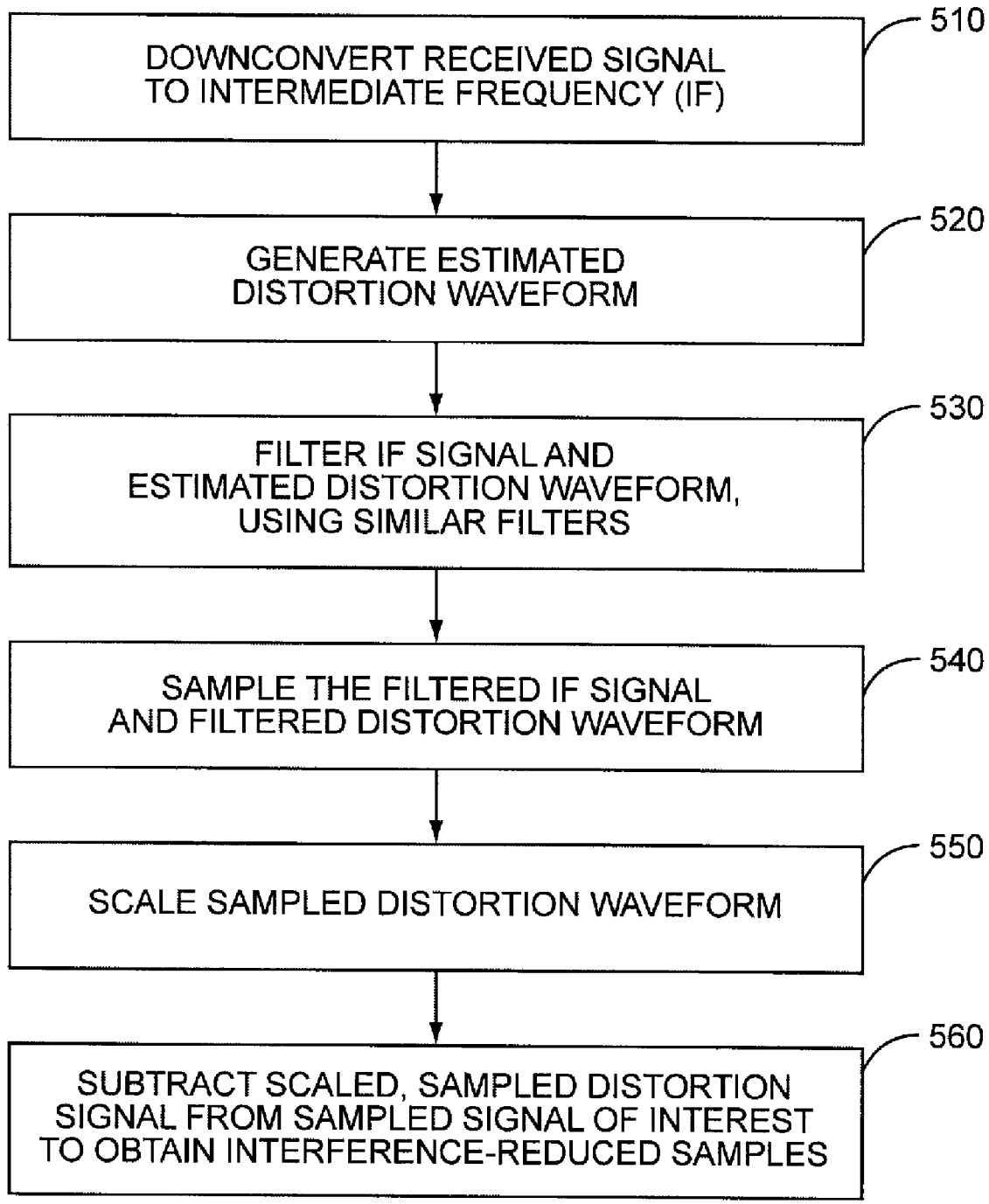
FIG. 5 illustrates an exemplary method for reducing interference from intermodulation distortion in a receiver.

With that in mind, FIG. 5 illustrates an exemplary method for reducing interference from intermodulation distortion in a receiver. Those skilled in the art will recognize that the method illustrated in FIG. 5 may be implemented using various embodiments of the receiver circuits described above.

The method of FIG. 5 begins at block 510, with the downconversion of a received RF signal to an intermediate frequency. Those skilled in the art will appreciate that a quadrature downconverter may be used in some embodiments, in which case the intermediate frequency signal may comprise an in-phase part and a quadrature part. In other embodiments a single mixer may be used at this stage, or an image rejection mixer may be used, resulting in a single intermediate frequency signal. In any event, as discussed above, the received RF signal may comprise one or more interfering signals; as a result, the resulting intermediate frequency signal may include one or more intermodulation products of the interfering signals at or near the intermediate frequency.

At block 520, an estimated distortion waveform is generated, to approximate one or more of these intermodulation products. As was discussed above in reference to FIG. 1, the estimated distortion waveform may be generated by a non-linear circuit configured to approximate one or more non-linear response characteristics of the downconverter circuit. In some embodiments, the non-linear circuit may comprise two or more separate non-linear functions, e.g., one that produces a square-law non-linearity and another that produces a third-order non-linearity. In other embodiments, a single non-linear circuit, e.g., a non-linear circuit that produces a dominant square-law non-linearity, may be sufficient.

In any event, at block 530, the intermediate frequency signal and the estimated distortion waveform are each (separately) filtered, using identical (or substantially similar) filters. Thus, the phase and amplitude response experienced by the intermediate frequency signal is also imposed on the estimated distortion waveform. At block 540, the filtered intermediate frequency signal and the filtered distortion waveform are sampled, to obtain a sampled signal of interest and a sampled distortion signal, respectively. As those skilled in the art will appreciate, especially in view of the various circuits described above, a number of approaches to sampling the intermediate frequency signal and the estimated distortion waveform may be used. For example, in some embodiments, particularly those employing low intermediate frequencies, the intermediate frequency signal (which may comprise in-phase and quadrature parts) may be sampled and digitized at the intermediate frequency, using an analog-to-digital converter with an appropriate sampling bandwidth. In these embodiments, a similar analog-to-digital converter is also used to digitize the distortion waveform.

In other embodiments the filtered intermediate frequency signal may be sampled using a quadrature sampler operating at the intermediate frequency. The resulting samples of the signal of interest may be digitized with an analog-to-digital converter. In these embodiments, an alternating sequence of in-phase and quadrature samples may be de-multiplexed to produce in-phase and quadrature samples of the distortion waveform. Again, similar circuitry may be employed for the distortion waveform. In still other embodiments, the intermediate frequency signal and the distortion waveform may be downconverted to baseband, using quadrature downconverters, and digitized, resulting in in-phase and quadrature samples of the intermediate frequency signal and of the distortion waveform.

At 550, the sampled distortion waveform is scaled, using a scaling factor. In view of the various receiver circuits discussed above, those skilled in the art will appreciate that such scaling may comprise applying a complex scaling factor to complex samples of the distortion waveform in some embodiments of the invention. In others, a first scaling factor may be applied to the sampled distortion waveform for use in reducing interference in in-phase samples of the signal of interest, while a second scaling factor is applied to the sampled distortion waveform for use in reducing interference in corresponding quadrature samples of the signal of interest.

Finally, at block 560, the scaled distortion signal samples are subtracted from the sampled signal of interest to obtain interference-reduced samples. Again, considering the various circuits discussed above, those skilled in the art will appreciate that this subtraction operation may comprise a single subtraction of a single complex value from a complex signal of interest, or separate subtraction operations for each of an in-phase sample of the signal of interest and a quadrature sample of the signal of interest.

Skilled practitioners will also appreciate that the scaling factor or factors used in the general method pictured in FIG. 5 may be obtained in various ways. One exemplary approach for determining and applying a scaling factor is pictured in FIG. 6. The skilled practitioner will recognize variants of this method that may be implemented using each of the circuits of FIGS. 1-4.

Figure 6:
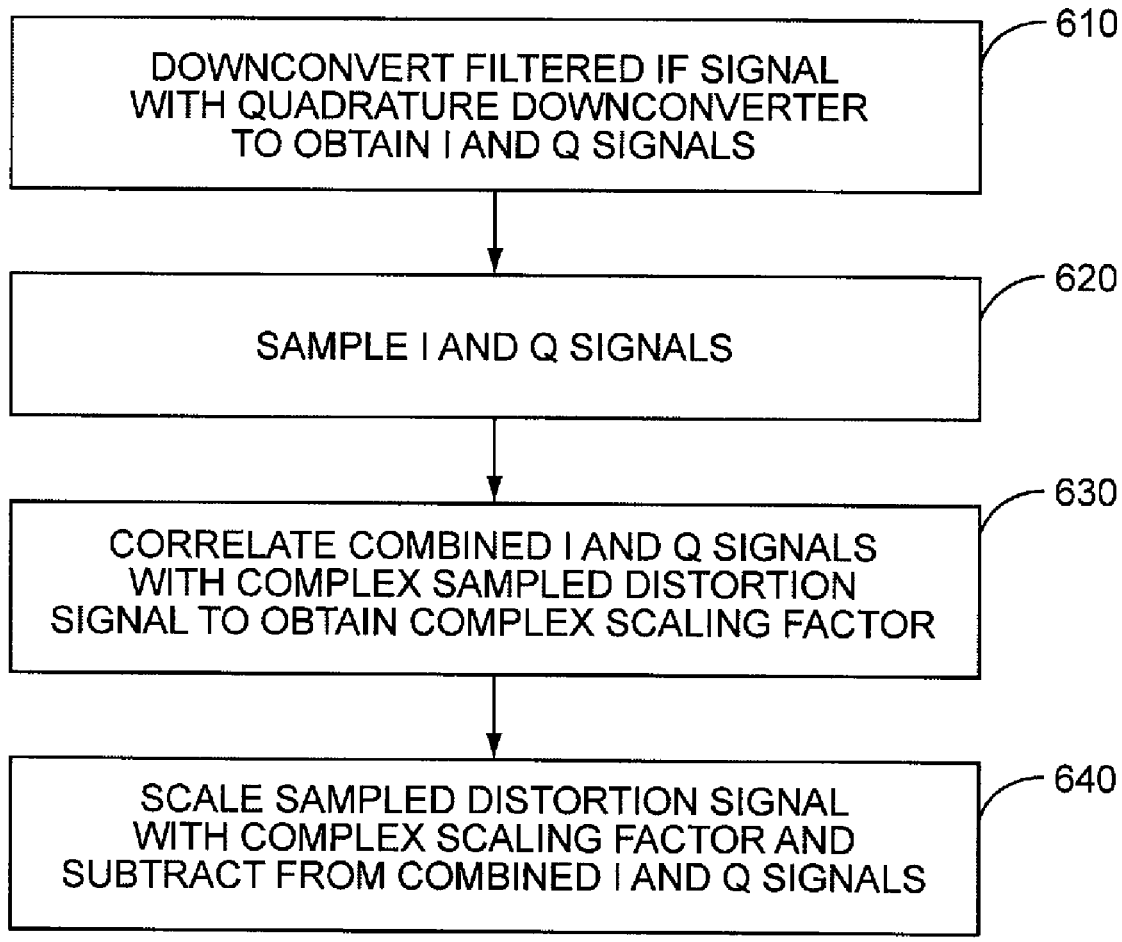
FIG. 6 illustrates an exemplary method for determining a scaling factor for use in removing a sampled distortion signal from a signal of interest.

The method of FIG. 6 begins with processing of a filtered intermediate frequency—thus it is assumed that the operations pictured in blocks 510, 520, and 530 have already taken place. Accordingly, block 610 illustrates the downconversion of the filtered intermediate frequency signal, using a quadrature downconverter, to obtain in-phase and quadrature signals at baseband frequencies. This downconversion may be implemented, for example, using the quadrature downconverters 209 pictured in FIGS. 2 and 3. At block 620, the in-phase and quadrature signals are sampled and digitized, using analog-to-digital converters such as ADCs 109a-b in FIGS. 2 and 3.

Corresponding downconversion and sampling operations (not shown) are performed on a distortion waveform. At block 630, the in-phase and quadrature samples of the signal of interest are combined, to form a complex sample, and correlated with a complex representation of the sampled distortion signal to obtain a complex scaling factor. The complex scaling factor is used to produce a scaled sampled distortion signal, as shown at block 640, which is subtracted from the complex samples of the signal of interest.

Those skilled in the art will appreciate that several of the processing steps discussed above may be performed with one or more general-purpose or special-purpose microprocessors, microcontrollers, or digital signal processing units. For example, several of the circuits pictured in FIGS. 1-4, including but not limited to the correlator circuits 111, 211, 411; complex multiplier circuits 120, 212, and 412; phase rotation generator 130; de-multiplexing switches 402, and subtraction circuits 110, may be implemented with programmable processing units, with hardware logic circuits, or a combination of both. One or more of these circuits may be implemented on an application-specific integrated circuit (ASIC) along with one or more additional circuits pictured in FIGS. 1-4. Further, any of these circuits may be combined with one or more processors and/or hardware configured to control the receiver circuitry and/or to implement a wireless protocol stack according to one or more wireless standards.

The above describes reducing strong signal interference in a narrow-band signal downconverted to a low IF processing frequency. The present invention also applies to reducing strong signal interference in a wideband signal downconverted to any desired processing frequency, e.g., baseband, IF, low IF, high IF, etc. For wideband signals, such as Orthogonal Frequency Division Multiplex (OFDM) signals, it may be difficult to determine three adjustment factors (e.g., complex scaling factor, phase rotation, and time delay) that are accurate over the entire signal bandwidth, especially if the filter mismatches are not rectified by a single phase rotation and complex scaling factor. The mismatch may be due to a mismatch in the filters' impulse responses or frequency responses, both of which are linear effects.

In some cases, a linear mismatch may be corrected by applying a frequency response correction digitally to either the estimated distortion waveform or to the desired signal, e.g., using an FIR filter. In effect, correlation between the estimated distortion waveform and the desired signal is performed for more than one time delay, and a complex scaling factor thereby obtained for each time delay such that upon subtraction of each scaled and phase rotated and differently time-shifted version of the estimated distortion waveform from the desired signal, the interference is now cancelled more accurately across the entire bandwidth of the desired signal.

The present invention may alternatively compensate for the interference by dividing the desired wideband signal into its individual frequency channels, and performing frequency channel specific interference compensation. To separate the wideband signal into its individual frequency channels, the wideband signal is subjected to a Fourier Transform, e.g., a Discrete Fourier Transform (DFT), after ADC conversion to divide the samples of the desired signal into a number of equal spaced, narrow frequency channels. Similarly, the estimated distortion waveform is subjected to a Fourier Transform to divide the samples of the estimated distortion waveform into the same number of equal spaced, narrow frequency channels. Now each frequency channel of the estimated distortion waveform may be scaled and subtracted from the corresponding frequency channel of the desired signal using a different complex scaling factor determined for that specific frequency channel. In this case, only a scaling factor and a phase rotation are determined for each frequency channel, as a time delay is equivalent to a phase rotation that changes with frequency and is incorporated in the chosen phase rotations. Furthermore, if the scaling factors, which are now reduced to a single complex number a+jb per frequency channel, are used only to compensate for fixed filter mismatches, the scaling factors may be determined using an infrequent calibration procedure, such as a factory calibration procedure or a power-up calibration procedure. An overall scaling factor may still be determined adaptively, e.g., by correlation, to ensure accurate subtraction of interference.

The above may be adequate for linear mismatches. However, there may also be non-linear effects due to the interference mechanisms being different for different frequency channels of the OFDM spectrum according to whether, after frequency downconversion, the frequency channels lie around DC or near the edge of the bandwidth. However, if a separate complex scaling factor is used for each OFDM frequency channel, adaptively determining the scaling factor separately by correlation for each frequency channel will also take care of such non-linear effects.

Figure 7:
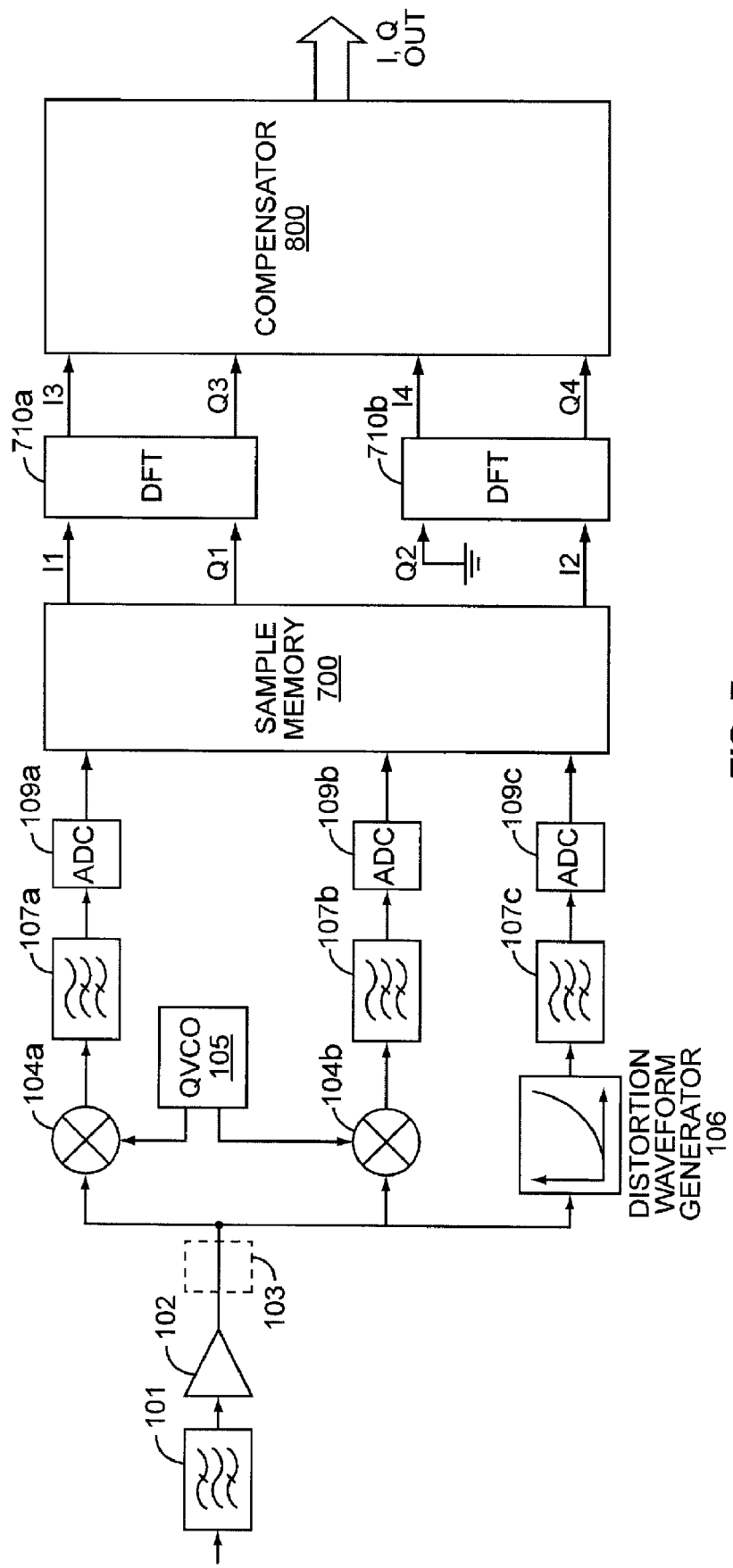
FIG. 7 illustrates an exemplary receiver circuit according to another embodiment of the present invention.

FIG. 7 shows one exemplary receiver that compensates for strong signal interference in a wideband signal according to the present invention. A signal received by an antenna is filtered through antenna filter 101, amplified by low-noise amplifier 102, optionally filtered again through inter-stage filter 103, and then quadrature-downconverted by mixers 104a, 104b against a local oscillator from Quadrature VCO 105, as discussed above. The signal is also submitted to distortion waveform generator 106, which creates an estimate of the non-linear distortion products in mixers 104a, 104b. Distortion waveform generator 106 does not generate a desired signal output because it does not mix the input signal down against the local oscillator signal from QVCO 105. Thus, the output from the distortion waveform generator 106 comprises only the unwanted interference components.

The desired signals from mixers 104a, 104b and the estimated distortion waveform from distortion waveform generator 106 are all filtered using similar intermediate frequency or baseband filters 107 a, b, c, which may include any or all of low pass, high-pass, and/or bandpass filters. Filters 107 a, b, c may comprise low pass filters if the receiver is designed to downconvert the desired OFDM signal to a processing frequency that straddles zero frequency (DC). If the OFDM signal is downconverted so as to avoid having desired components at DC, then filters 107 *a, b, c* may include a high-pass component. This situation may occur, e.g., when all desired frequency channels lie on one side or the other of DC (the low-IF solution), or when no frequency channel is converted down to lie at zero frequency, or if the frequency channel that would lie at zero frequency is deliberately omitted or unused. The combination of high-pass and low-pass filtering may also sometimes best be realized with a bandpass filter.

The filtered baseband signals are then Analog-to-Digital converted in ADC converters 109 *a, b, c* at the same sample rate using the same sampling clock. Sample memory 700, which serves as a serial-to-parallel converter, collects the samples. Desired signal samples output by ADC converters 109*a*, 109*b* are denoted I1,Q1, and are collected into a block of complex values by sample memory 700 that are Fourier Transformed by DFT 710*a* to yield complex values for the individual OFDM frequency channels. Estimated distortion waveform samples output by ADC converter 109*c* are denoted by I2. The estimated distortion waveform samples only include real values, and therefore, do not contain a corresponding source of quadrature values (i.e., Q=0). A block of values I2,Q2 of the same size as the block of I1,Q1 values is assembled and Fourier transformed in DFT unit 710*b* to yield estimated distortion waveform samples for each OFDM frequency channel. Because the estimated distortion waveform values do not include any quadrature values, the quadrature input to DFT unit 710*b* is connected to ground or otherwise set to zero, omitted, or ignored in the subsequent calculation.

The outputs of DFT units 710*a*, 710*b* are like-sized blocks of complex numbers denoted by I3,Q3 and I4,Q4, respectively. The blocks of I3,Q3 and I4,Q4 values are jointly processed by interference compensator 800 to subtract from the desired signal in each frequency channel, a scaled and phase-adjusted version of the same frequency channel's estimated distortion waveform to obtain interference compensated signals for each OFDM frequency channel. The interference compensated signals for each OFDM frequency channel are then passed on for decoding in a decoder (not shown).

In order to derive the function performed by compensator 800, it is helpful to bear in minds the following assumptions:

(1) The non-linear interference mechanisms in mixers 104*a*, 104*b* are substantially identical for a given frequency channel, but may vary across the frequency band.

(2) Mismatches in the linear filters 107*a*, 107*b* may cause a slight difference in amplitude or phase, both of which may be described by a complex scaling factor Ci(k) for the In-Phase channel and Cq(k) for the Quadrature channel, where k is the frequency channel index.

(3) The distortion waveform generator 106 successfully mimics the non-linear interference mechanisms of mixers 104*a*, 104*b*, apart from a scaling factor and phase shift per frequency channel, which also describes any mismatch between filter 107*c* and its counterparts in the desired signal processing path. The scaling factors may be absorbed into the scaling factors Ci(k), Cq(k), which thus describe the complex scaling per frequency channel of the estimated distortion waveform necessary to match the interference in the desired signal channels.

Thus, the frequency channel component k of signal I1 includes an amount of interference equal to Ci(k) times the frequency component k of signal I2. Similarly, the frequency channel component k of signal Q1 includes an amount of interference equal to Cq(k) times the frequency component k of signal I2.

Components at frequency k of the real estimated distortion waveform I2 may be denoted by:

$$Ic(k)\cos(w_k t)+Is(k)\sin(w_k t)=0.5(Ic(k)-jIs(k))e^{jw_k t}+ \\ 0.5(Ic(k)+jIs(k))e^{-jw_k t}. \quad (5)$$

Thus, the real estimated distortion waveform may be seen as comprising a complex exponential at $+w_k$ of amplitude 0.5(Ic(k)−jIs(k)), and a complex exponential at $−w_k$ of amplitude 0.5(Ic(k)+jIs(k)). The term (Ic(k)−jIs(k)) may be regarded as the amplitude I2(k) of the complex exponential at +Wk. Likewise, (Ic(k)+jIs(k)) may be regarded as the amplitude I2(−k) of the complex exponential at the mirror frequency $−w_k$.

Multiplying the scaling factor Ci(k) by I2(k) gives the value of the interference in I1(k) at frequency $+w_k$, taking into account mismatches, as shown by Equation (6).

$$I1(k)=Ci(k)I2(k) \quad (6)$$

Similarly, there is a component I1(−k)=Ci(−k)I2(−k) at $−w_k$. For real signals, mirror image components are always complex conjugates of each other. Thus, Ci(−k)=Ci*(k). It will be appreciated that the same logic may be applied to the quadrature element to show that the corresponding components of Q1 may be given by:

$$Q1(k)=Cq(k)I2(k)$$

$$Q1(-k)=Cq(-k)I2(-k) \quad (7)$$

At the output of DFT unit 710*a*, the frequency channel components for the desired signal are resolved, with (I3(k), Q3(k)) being the result of applying I1(k) to the in-phase input and Q1(k) to the quadrature input. DFT unit 710*a* regards the input (I1,Q1) as equal to I1+jQ1. The component of the DFT unit output at frequency $+w_k$ is thus:

$$(I3(k),Q3(k))=Ci(k)I2(k)+jCq(k)I2(k)=(Ci(k)+ \\ jcq(k))I2(k), \quad (8)$$

and the component at $−w_k$ is:

$$(I3(-k),Q3(-k))=Ci(-k)I2(-k)+jCq(-k)I2(-k)= \\ (Ci(-k)+jCq(-k))I2(-k). \quad (9)$$

DFT unit 710*b* calculates the value of the complex amount I2(k) of frequency $+w_k$ in its input signal and delivers the result as (I4(k)+jQ4(k)) where I4 and Q4 are real values that respectively equal the real and imaginary parts of I2(k).

In order to reduce the strong-signal interference in the desired signal samples, we have to find scaling factors Ci(k), Cq(k) that satisfy:

$$I3(k)+jQ3(k)=(Ci(k)+jCq(k))(I4(k)+jQ4(k)). \quad (10)$$

Letting C(k)=Ci(k)+jCq(k)=a(k)+jb(k), where a and b are real, it is thus desirable to find C(k)=a(k)+jb(k) that satisfies:

$$I3(k)+jQ3(k)=C(k)(I4(k)+jQ4(k)) \quad (11)$$

In one embodiment, the complex scaling factor C(k) may be found by complex-correlating (I3(k)+jQ3(k)) with (I4(k)+jQ4(k)) over a sufficient number of OFDM symbol periods for the desired signal content of (I3(k)+jQ3(k)) to average to near zero. That is:

$$C(k) = \frac{\text{Mean value of } \{(I4(k) - jQ4(k))(I3(k) + jQ3(k))\}}{\text{Mean value of } \{(I4(k) - jQ4(k))(I4(k) + jQ4(k))\}}, \quad (12)$$

where a similar result applies to C(−k).

The above shows that compensating all impairments across all frequency channels of a wideband signals reduces to performing a complex correlation between corresponding frequency channel bin outputs of DFT units 710*b*, 710*a* to determine the complex scaling factor C(k) used to scale the output (I4(k),Q4(k)) of DFT unit 710b to sufficiently subtract the interference from the corresponding output (I3(k),Q3(k)) of DFT unit 710a. This operation is performed for all bin indices k, including mirror image bins with index −k. When the complex scaling factor is accurately determined, the output (I3(k),Q3(k)) comprises an interference compensated desired signal for each frequency channel k.

Note that Ci(−k)=Ci*(k) and Cq(−k)=Cq*(k). Therefore, C(−k)=Ci*(k)+jCq*(k), which is not equal to C*(k). Hence the correlation is done for the +k and −k frequency channels separately, and no assumption about conjugate symmetry of the results is made. Simply expressed, every complex frequency channel value output from DFT 710a is correlated with the corresponding frequency channel value output from DFT 710b to determine a complex scaling factor used to scale the estimated distortion waveform output by DFT 710b to obtain a compensating value to subtract from the desired signal output by DFT 710a.

Figure 8:
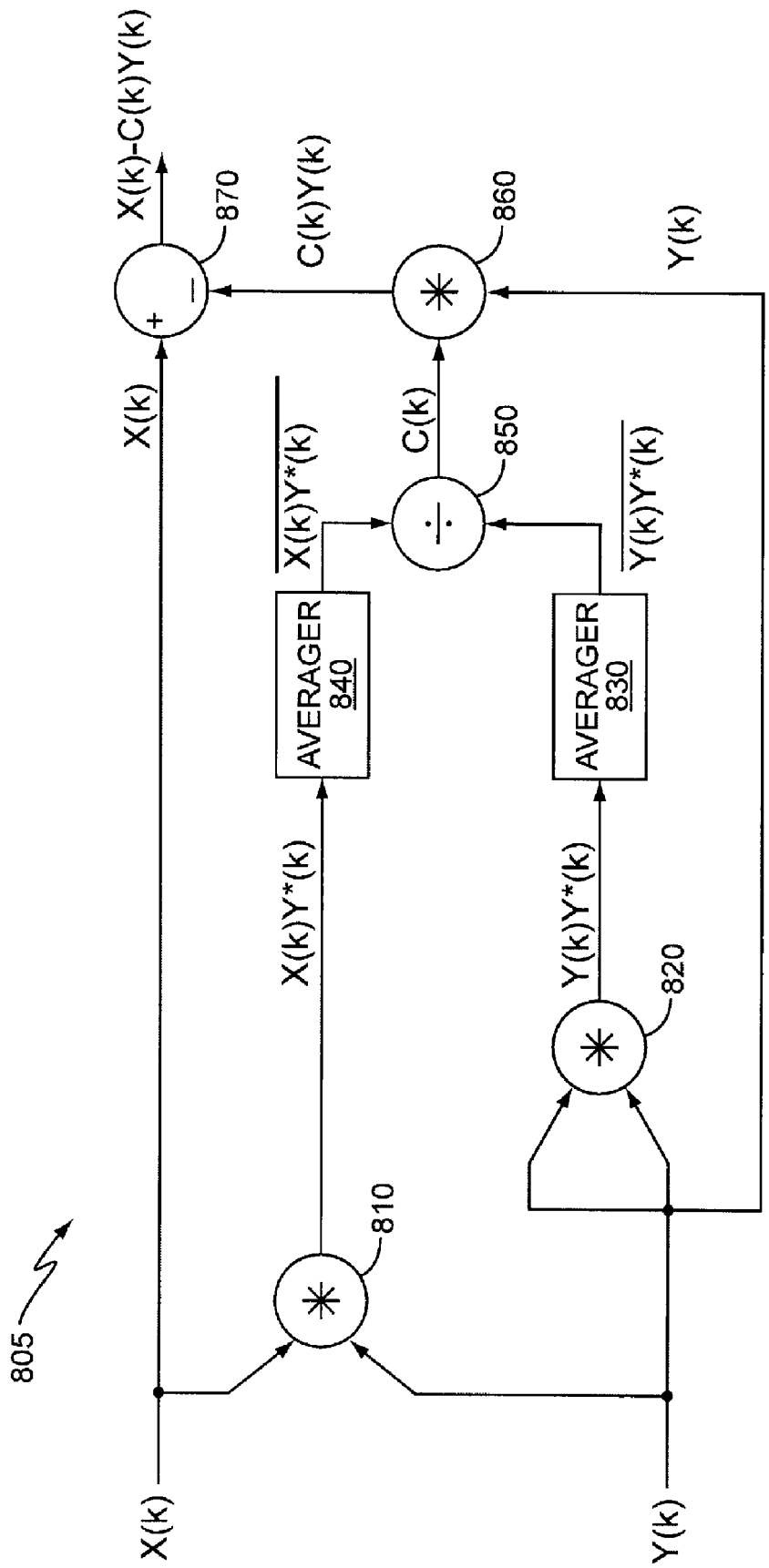
FIG. 8 illustrates an exemplary interference compensator for the receiver circuit of FIG. 7.

FIG. 8 illustrates an exemplary block diagram for an interference compensation unit 805 in compensator 800. Interference compensation unit 805 comprises cross-correlator 810, autocorrelator 820, averaging units 830, 840, divider 850, multiplier 860, and combiner 870. The desired complex signal samples for a given frequency channel output by DFT unit 710a is represented by X, and is input to one input of cross-correlator 810. The estimated distortion waveform samples for the same frequency channel output by DFT unit 710b is represented by Y, and is applied to the other input of cross-correlator 810. Cross-correlator 810 correlates X with Y by multiplying X by the complex conjugate of Y. Autocorrelator 820 likewise correlates Y with itself by multiplying Y by its complex conjugate. The outputs of correlators 810, 820 are averaged separately in averaging units 830, 840 over a large number of OFDM symbol periods. Averaging units 830, 840 may average the correlator outputs over a rectangular block moving window. Alternatively, the averaging units 830, 840 may employ exponential forgetting. Both of these averaging options are well known and involve only updating the current average using the new values. Divider 850 divides the average output by averaging unit 840 by the average output by averaging unit 830, the latter being a real quantity, to produce an output which represents the complex correlation of X with Y. This value is represented herein as the scaling factor C(k). Multiplier 860 scales the estimated distortion waveform Y by multiplying it by the complex correlation value C(k) output by divider 850. Combiner 870 subtracts the scaled estimated distortion waveform from the desired signal OFDM frequency channel value X to give interference-compensated OFDM signal for that frequency channel.

The function of FIG. 8 is repeated for all desired signal OFDM frequency channels to produce a set of compensated OFDM frequency channel values for decoding user data. In one embodiment, the interference compensation function may be implemented for each frequency channel by including one interference compensation unit 805 for each frequency channel in the interference compensator 800. In another embodiment, compensator 800 may include a single interference compensation unit 805, where software is used to serially pass the desired signal and estimated distortion waveform signal samples for each frequency channel through the interference compensation unit 805. In still another embodiment, compensator 800 may use a combination of software and interference compensation units 805 to execute the interference compensation function for each frequency channel.

Although the above describes generating and applying a scaling factor for each frequency channel, the present invention is not limited to this implementation. The present invention generally applies to a selected number of frequency channels, where the selected number may comprise all of the plurality of frequency channels or some subset of the plurality of frequency channels. In some embodiments, scaling factors are generated and applied to only a selected subset of frequency channels, e.g., the low frequency channels. In other embodiments, computational savings may be achieved by exploiting similarities associated with neighboring frequency channels. For example, compensator 800 may assume that the scaling factors for two or more adjacent frequency channels are essentially equivalent. Thus, to save computing power, the compensator 800 may determine a scaling factor for a selected number of frequency channels less than the total number of frequency channels, and may reuse the determined scaling factor for the remaining frequency channels. For example, compensator 800 may determine a new scaling factor for every fourth frequency channel. Thus, frequency channels one, two, and three may all use the scaling factor determined for frequency channel one. Alternatively, frequency channels one, two, and three may all use an average scaling factor obtained by averaging some number of determined scaling factors, e.g., the first and fourth scaling factors. It will be appreciated that any combination of the above-described embodiments may also be used to implement the present invention.

Thus it has been described how non-linear, strong signal effects in a wideband OFDM homodyne, low-IF, or conventional receiver may be reduced, thereby providing the receiver with an improved strong-signal handling capability. Such interference rejection capabilities for wideband signals may be important in designing low-cost, low-power receivers for battery operated handheld wireless devices.

The invention anticipates that strong signal effects may depend on whether the receiver is a homodyne receiver, which only would apply for the OFDM frequency channel value that mixes down to an intermediate frequency of zero, or alternatively to a so-called low-IF receiver in which the signal mixes down in the quadrature downconvertor 104a, 104b to an intermediate frequency that is not zero, but that is less than the total RF bandwidth, or yet again to a high-IF receiver in which the signal mixes down to an IF greater than the total RF bandwidth imposed by antenna and inter-stage filters. Indeed, different frequency channels of the OFDM signal may fall into different ones of the categories of homodyne, low-IF, or high-IF, which the invention handles by using a separate compensating calculation adapted to the frequency of each OFDM frequency channel. The invention may thus be applied to cases where the quadrature downconverter 104a, 104b converts the desired OFDM frequencies to frequencies all on the positive side of zero, all on the negative side of zero frequency, or straddling zero frequency with some frequency channels on both sides of zero.

FIGS. 7 and 8 show a receiver circuit configured to reduce interference from intermodulation distortion in an OFDM signal. The receiver circuit provides a means for reducing strong-signal interference effects in wideband receivers, e.g., OFDM receivers, operating at any processing frequency (e.g., baseband, low IF, IF, high IF, etc.). Of course, those skilled in the art will appreciate that the illustrations are not exhaustive, and many variations may be made by a person skilled in the art without departing from the scope of the invention as described by the attached claims. Further, those skilled in the art will appreciate the embodiments of FIGS. 7 and 8 may be modified to according to the teachings of the near-IF receiver circuits of FIGS. 1-4.

Figure 9:
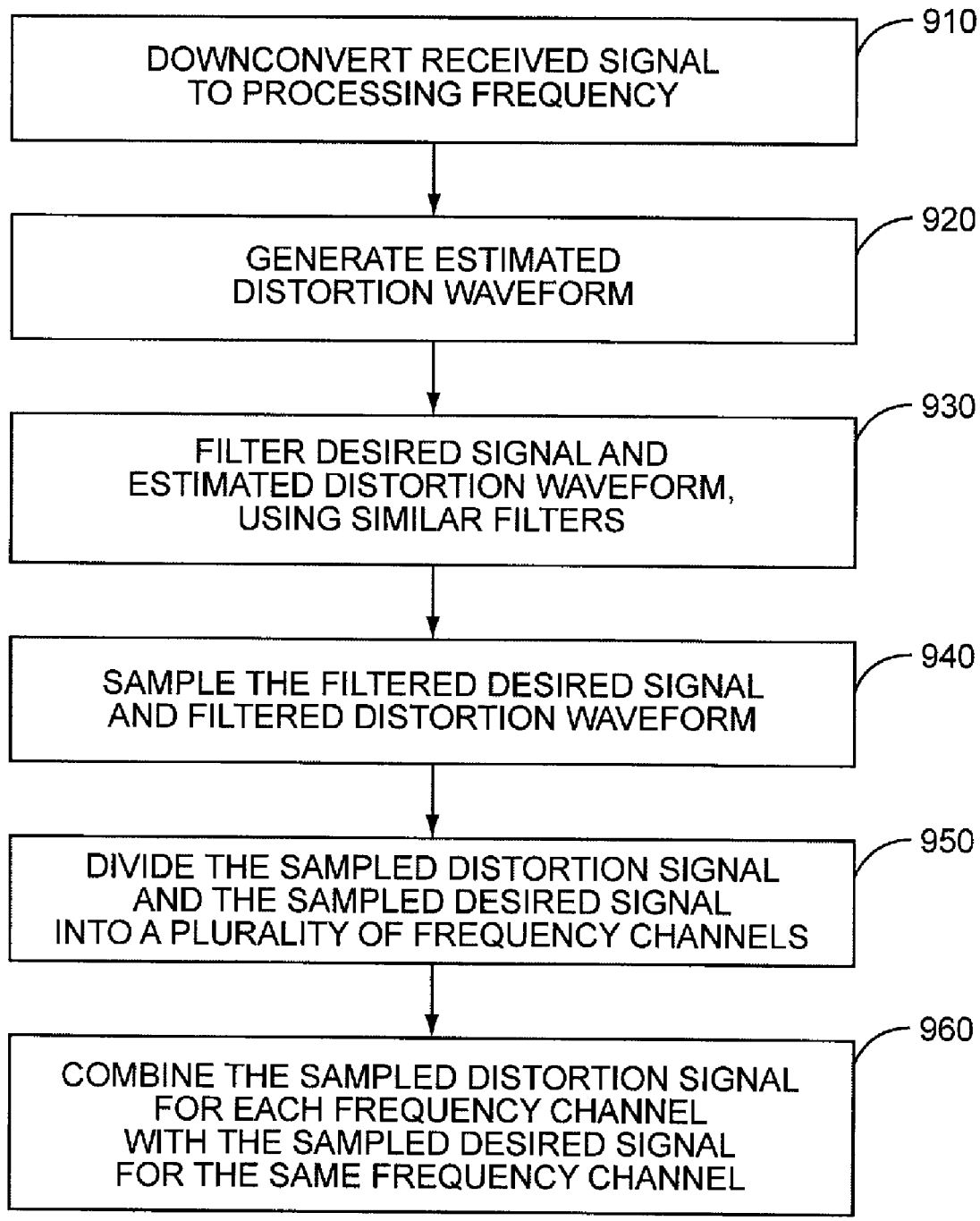
FIG. 9 illustrates an exemplary method for determining the scaling factors for use in removing a sampled distortion signal from a wideband signal of interest.

With that in mind, FIG. 9 shows an exemplary method for reducing interference from intermodulation distortion in a wideband receiver. Those skilled in the art will recognize that the method illustrated in FIG. 9 may be implemented using various embodiments of the receiver circuits described above. The method of FIG. 9 begins at block 910, with the downconversion of a received RF signal to a processing frequency. Those skilled in the art will appreciate that a quadrature downconverter may be used in some embodiments, in which case the intermediate frequency signal may comprise an in-phase part and a quadrature part. Because the received RF signal may comprise one or more interfering signals, the resulting signal may include one or more intermodulation products of the interfering signals at or near the processing frequency.

At block 920, an estimated distortion waveform is generated, to approximate one or more of these intermodulation products, as discussed above. At block 930, the desired signal and the estimated distortion waveform are each separately filtered, using identical (or substantially similar) filters. Thus, the phase and amplitude response experienced by the desired signal is also imposed on the estimated distortion waveform. At block 940, the filtered desired signal and the filtered distortion waveform are sampled, to obtain a sampled signal of interest and a sampled distortion signal, respectively. As those skilled in the art will appreciate, especially in view of the various circuits described above, a number of approaches to sampling the desired signal and the estimated distortion waveform may be used.

At block 950, the sampled signal of interest and the sampled distortion signal are both divided into a plurality of frequency channels. As discussed above, a discrete Fourier transform unit may be used to achieve the frequency channel division. At block 960, the sampled distortion signal for each frequency channel is combined with the sampled signal of interest for the same frequency channel to obtain interference-reduced samples for each frequency channel.

Of course, the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A receiver circuit, comprising:
    a downconverter unit configured to downconvert a received radio frequency signal, comprising a desired signal and one or more interfering signals, to a processing frequency, to obtain a processing frequency signal;
    a distortion waveform generator configured to generate an estimated distortion waveform from the one or more interfering signals, the estimated distortion waveform comprising one or more intermodulation products of the interfering signals;
    first and second filters configured to filter the processing frequency signal and the estimated distortion waveform, respectively;
    first and second sampling units configured to sample the filtered processing frequency signal and the filtered estimated distortion waveform to obtain a sampled signal of interest and a sampled distortion signal, respectively;
    first and second transform units to divide the sampled signal of interest and the sampled distortion signal, respectively, into a plurality of frequency channels; and
    an interference subtracting unit configured to combine the sampled distortion signal for each of a selected number of frequency channels with the corresponding sampled signal of interest for each of the same frequency channels to obtain interference-reduced signal samples for each of the selected number of frequency channels.

2. The receiver circuit of claim 1, wherein the first and second transform units comprise first and second discrete Fourier transform units.

3. The receiver circuit of claim 1, wherein the distortion waveform generator comprises a non-linear circuit configured to approximate one or more non-linear response characteristics of the downconverter unit.

4. The receiver circuit of claim 1, wherein the interference subtraction unit comprises:
    a first correlator configured to correlate the sampled signal of interest for each of the selected number of frequency channels with the corresponding sampled distortion signal for each of the same frequency channels to obtain a first factor for each of the selected number of frequency channels;
    a second correlator configured to correlate the sampled distortion signal for each of the selected number of frequency channels with itself to obtain a second factor for each of the selected number of frequency channels;
    a scaling unit configured to scale the sampled distortion signal for each of a second selected number of frequency channels based on the first and second factors; and
    a subtracting unit configured to subtract the scaled, sampled, distortion signal for each of the second selected number of frequency channels from the corresponding sampled signal of interest for each of the same second selected number of frequency channels to obtain the interference-reduced signal samples for each of the second selected number of frequency channels.

5. The receiver circuit of claim 4, wherein the interference subtraction unit further comprises:
    a first averaging unit to average the first factor for each of the selected number of frequency channels over a plurality of OFDM symbol periods;
    a second averaging unit to average the second factor for each of the selected number of frequency channels over a plurality of OFDM symbol periods; and
    a divider to divide the averaged first and second factors generated for each of the same frequency channels to generate a scaling factor for each of the selected number of frequency channels.

6. The receiver circuit of claim 5, wherein the selected number of frequency channels comprises all of the plurality of frequency channels, and wherein the second selected number of frequency channels equals the selected number of frequency channels.

7. The receiver circuit of claim 5, wherein the selected number of frequency channels comprises a subset of the plurality of frequency channels comprising fewer than the plurality of frequency channels.

8. The receiver circuit of claim 7, wherein the scaling unit is configured to scale the sampled distortion signal for each of the selected number of frequency channels using the scaling factor generated for each of the same frequency channels and to reuse the determined scaling factors to scale the sampled distortion signal for the remaining frequency channels.

9. The receiver circuit of claim 1, wherein the interference subtraction unit comprises a plurality of interference subtraction units, and wherein each interference subtraction unit corresponds to a different frequency channel.

10. The receiver circuit of claim 1, wherein the downconverter unit comprises a quadrature downconverter configured to downconvert the received radio frequency signal to obtain in-phase and quadrature signals at the processing frequency, and wherein the first sampling circuit is configured to sample the filtered processing frequency signal by sampling the in-phase and quadrature signals to obtain in-phase and quadrature samples of the signal of interest.

11. The receiver circuit of claim 1, wherein the processing frequency comprises one of an intermediate frequency, a low intermediate frequency, and a baseband frequency.

12. A method for reducing interference from intermodulation distortion in a receiver, the method comprising:
    downconverting a received radio frequency signal comprising a desired signal and one or more interfering signals to obtain a processing frequency signal;
    generating an estimated distortion waveform from the one or more interfering signals, the estimated distortion waveform comprising one or more intermodulation products of the interfering signals;
    filtering the processing frequency signal and the estimated distortion waveform with first and second filters, respectively;
    sampling the filtered processing frequency signal and the filtered estimated distortion waveform to obtain a sampled signal of interest and a sampled distortion signal, respectively;
    dividing each of the sampled signal of interest and the sampled distortion signal into a plurality of frequency channels; and
    combining the sampled distortion signal for each of a selected number of frequency channels with the corresponding sampled signal of interest for each of the same frequency channels to obtain interference-reduced signal samples for each of the selected number of frequency channels.

13. The method of claim 12, wherein dividing each of the sampled signal of interest and the sampled distortion signal into a plurality of frequency channels comprises applying a discrete Fourier transform to each of the sampled signal of interest and the sampled distortion signal.

14. The method of claim 12, wherein generating an estimated distortion waveform from the one or more interfering signals comprises applying the one or more interfering signals to a non-linear circuit approximating one or more non-linear response characteristics of a downconverter unit used to downconvert the received radio signal.

15. The method of claim 12, wherein combining the sampled distortion signals with the corresponding sampled signals of interest comprises:
    correlating the sampled signal of interest for each of the selected number of frequency channels with the corresponding sampled distortion signal for each of the same frequency channels to obtain a first factor for each of the selected number of frequency channels;
    correlating the sampled distortion signal for each of the selected number of frequency channels with itself to obtain a second factor for each of the selected number of frequency channels;
    scaling the sampled distortion signal for each of a second selected number of frequency channels based on the first and second factors; and
    subtracting the scaled, sampled, distortion signal for each of the second selected number of frequency channels from the corresponding sampled signal of interest for each of the same second selected number of frequency channels to obtain the interference-reduced signal samples for each of the second selected number of frequency channels.

16. The method of claim 15, further comprising:
    averaging the first factor for each of the selected number of frequency channels over a plurality of OFDM symbol periods;
    averaging the second factor for each of the selected number of frequency channels over a plurality of OFDM symbol periods; and
    dividing the averaged first and second factors generated for each of the same frequency channels to generate a scaling factor for each of the selected number of frequency channels.

17. The method of claim 16, wherein the selected number of frequency channels comprises all of the plurality of frequency channels, and wherein the second selected number of frequency channels equals the selected number of frequency channels.

18. The method of claim 16, wherein the selected number of frequency channels comprises a subset of the plurality of frequency channels comprising fewer than the plurality of frequency channels.

19. The method of claim 18, wherein scaling the sampled distortion signal comprises scaling the sampled distortion signal for each of the selected number of frequency channels using the scaling factor generated for each of the same frequency channels and reusing the determined scaling factors to scale the sampled distortion signal for the remaining frequency channels.

20. The method of claim 12, wherein combining the sampled distortion signal for each of the selected number of frequency channels with the corresponding sampled signal of interest for each of the same frequency channels comprises combining the sampled distortion signal with the corresponding sampled signal of interest for different frequency channels in separate interference subtraction units associated with the different frequency channels.

21. The method of claim 12, wherein downconverting the received radio frequency signal comprises downconverting the received radio frequency signal with a quadrature downconverter to obtain in-phase and quadrature signals at the processing frequency, and wherein sampling the filtered processing frequency signal comprises sampling the in-phase and quadrature signals to obtain in-phase and quadrature samples of the signal of interest.

22. The method of claim 12, wherein the processing frequency comprises one of an intermediate frequency, a low intermediate frequency, and a baseband frequency.

* * * * *

UNITED STATES PATENT AND TRADEMARK OFFICE
CERTIFICATE OF CORRECTION

| | |
|---|---|
| PATENT NO. | : 8,090,320 B2 |
| APPLICATION NO. | : 12/339630 |
| DATED | : January 3, 2012 |
| INVENTOR(S) | : Dent et al. |

It is certified that error appears in the above-identified patent and that said Letters Patent is hereby corrected as shown below:

IN THE SPECIFICATIONS:

In Column 4, Line 64, in Equation (1), delete "$(S_U+S_L)^3=S_U$" and insert -- $(S_U+S_L)^3=S_U^3$ --, therefor.

In Column 18, Line 10, delete "+Wk." and insert -- $+w_k$. --, therefor.

In Column 18, Lines 34-35, in Equation (8), delete "$=(Ci(k)+jcq(k))I2(k),$" and insert -- $=(Ci(k)+jCq(k))I2(k),$ --, therefor.

Signed and Sealed this
Nineteenth Day of June, 2012

David J. Kappos
*Director of the United States Patent and Trademark Office*